(12) United States Patent
Jameson

(10) Patent No.: US 6,785,664 B2
(45) Date of Patent: Aug. 31, 2004

(54) COLLECTION KNOWLEDGE SYSTEM

(76) Inventor: Kevin Wade Jameson, 148 Edgebank Place NW., Calgary, AB (CA), T3A 4L4

( * ) Notice: Subject to any disclaimer, the term of this patent is extended or adjusted under 35 U.S.C. 154(b) by 672 days.

(21) Appl. No.: 09/885,079

(22) Filed: Jun. 21, 2001

(65) Prior Publication Data

US 2003/0028500 A1 Feb. 6, 2003

(51) Int. Cl.$^7$ .............................. G06F 17/00; G06N 5/00
(52) U.S. Cl. ............................... 706/47; 706/46; 706/61
(58) Field of Search ............................................ 706/47

(56) References Cited

U.S. PATENT DOCUMENTS

| | | | | |
|---|---|---|---|---|
| 5,706,405 A | * | 1/1998 | Short et al. ................... | 706/45 |
| 5,917,489 A | * | 6/1999 | Thurlow et al. ............. | 345/809 |
| 6,021,403 A | * | 2/2000 | Horvitz et al. ................ | 706/45 |
| 6,057,841 A | * | 5/2000 | Thurlow et al. ............. | 345/809 |

* cited by examiner

Primary Examiner—Anthony Knight
Assistant Examiner—Michael B. Holmes

(57) ABSTRACT

A Collection Knowledge System provides context-sensitive knowledge delivery services to application programs, thereby enabling application programs to effectively support variant computational processes.

In operation, a Collection Knowledge System receives knowledge requests from application programs, performs local and remote lookups into structured trees of knowledge, and returns requested knowledge to requesting application programs.

Collection Knowledge Systems can manage knowledge for entire variant computational processes, thereby enabling application programs to calculate and execute many variant computational processes in fully automated, scalable ways that were not previously possible. As a consequence of automated process construction and execution, associated human labor costs are effectively reduced to zero.

54 Claims, 29 Drawing Sheets

```
1   c:\collections
2      notes.txt
3      myletter.doc
4      c-myhomepage
5
6         s
7            homepage.html
8            myphoto.jpg
```

FIG. 2

```
1   c:\collections
2      notes.txt
3      myletter.doc
    ┌─────────────────────────────────┐ 100
    │ 4      c-myhomepage             │
    │ 5         cspec                 │
    │ 6         s                     │
    │ 7            homepage.html      │
    │ 8            myphoto.jpg        │
    └─────────────────────────────────┘
```

FIG. 3

```
┌───────────────────────────────────────────────┐ 102
│ 1   collection    c-myhomepage                │
│ 2   coll-type     cf-web-page                 │
│ 3   coll-desc     A sample homepage collection│
│ 4   end-collection                            │
└───────────────────────────────────────────────┘
```

FIG. 1
PRIOR ART
```
1    c:\collections
2       notes.txt
3       myletter.doc
4       c-myhomepage
5
6          s
7             homepage.html
8             myphoto.jpg
```
FIG. 2
```
1    c:\collections
2       notes.txt
3       myletter.doc
```
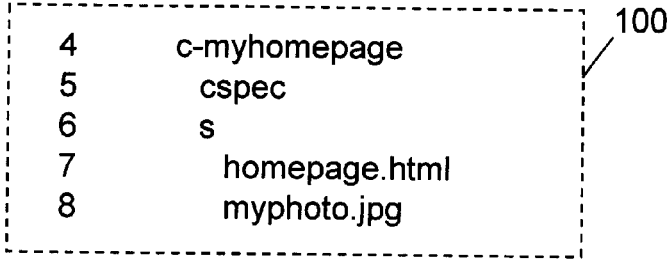
```
4       c-myhomepage
5          cspec
6          s
7             homepage.html
8             myphoto.jpg
```
FIG. 3
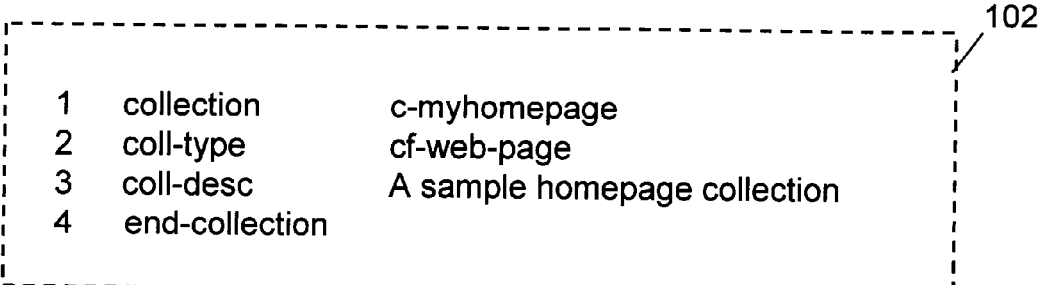
```
1   collection      c-myhomepage
2   coll-type       cf-web-page
3   coll-desc       A sample homepage collection
4   end-collection
```

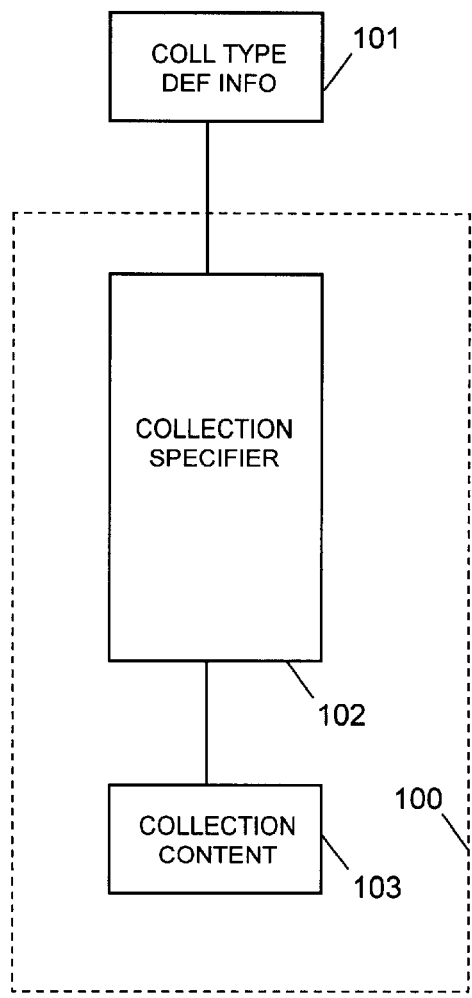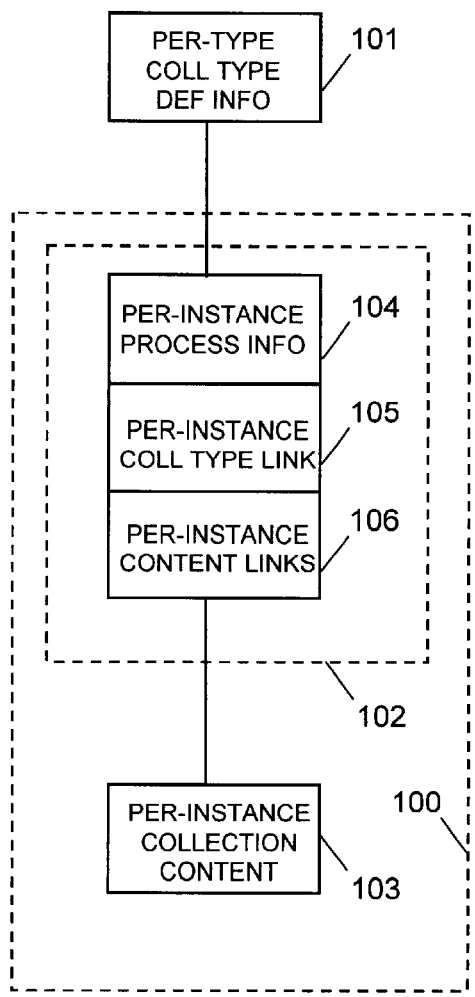

FIG. 8

```
1   /* collection data structure */
2   collection-info {

3     + specifier_info
4         + coll-type-indicator
5         + other specifier information ...

6     + content_info
7         + content_location_info ...
8         + content_members ...
9         + other content information...

10    + other collection structure information...
11  }
```

FIG. 9

```
1   /* collection type definition data structure */
2   collection-type-definition-info {

3     + coll-type-name
4     + collection internal structure info ...
5     + collection content location info ...
6     + collection content type recognition info ...

7     + other collection type definition information...
8   }
```

FIG. 10

| KEY | VALUE |
|---|---|

1 /* collection type internal structure definitions */
2 dir_source_files     ./s
3 dir_doc_files     ./doc 4 /* content location definitions (per-type content links) */
5 content_subtree_http     http://host.com/some/dir/name
6 content_subtree_ftp     ftp://host.com/some/dir/name
7 content_subtree_nfs     /some/local/directory/name 8 /* content type recognition definitions */
9 content_policy     subtree_below_cspec_file
10 content_file_type     .c     file_cpp
11 content_file_type     .c     file_c
12 content_file_type     .h     file_c_include
13 content_file_type     .doc     file_ms_word
14 content_file_type     .html     file_html
15 content_file_type     .xls     file_ms_excel 16 /* collection processing definitions */
17 compile_c_files     yes
18 compiler_windows     vc++
19 compiler_unix     gcc
20 build platforms     Win98, Win2000, gnulinux
21 process files     compile link
22 link libraries     stdio math sock 23 /* results dispatching definitions */
24 results_ftp_host     ftp.output.com
25 results_ftp_dir     c:\ftphome\collection\results

FIG. 11

| | |
|---|---|
| 1 | # tree structures separate program knowledge |
| 2 | # |
| 3 | /site/cks/app-1/app-1.cfg |
| 4 | /site/cks/app-1/datafiles |
| 5 | /site/cks/app-2/app-2.cfg |
| 6 | /site/cks/app-2/datafiles |

FIG. 12

| | |
|---|---|
| 1 | # knowledge trees containing knowledge |
| 2 | /home/user/my-cks/app-1/app-1.cfg |
| 3 | /site/cks/team/app-1/app-1.cfg |
| 4 | /site/cks/team/... |
| 5 | /site/cks/dept/app-1/app-1.cfg |
| 6 | /site/cks/dept/... |
| 7 | /site/cks/company/app-1/app-1.cfg |
| 8 | /site/cks/company/... |
| 9 | /site/cks/vendor/app-1/app-1.cfg |
| 10 | /site/cks/vendor/... |

FIG. 13

| | |
|---|---|
| 1 | # search rules for knowledge trees |
| 2 | rule /home/user/my-cks/... |
| 3 | rule /site/cks/team/... |
| 4 | rule /site/cks/dept/... |
| 5 | rule /site/cks/company/... |
| 6 | rule /site/cks/vendor/... |

FIG. 14

```
1   # static hardcoded search rules
2   rule    /home/user/my-cks/...
3   rule    /site/cks/team/...
4   rule    /site/cks/dept/...
5   rule    /site/cks/company/...
6   rule    /site/cks/vendor/...

7   # dynamic search rules with placeholder strings
8   rule        $HOME/my-cks/default/_app_/gnulinux2/...
9   #
10  rule        _COLL_/cks/default/_app_/gnulinux2
11  rule        _COLL_/cks/default/_app_/gnulinux
12  rule        _COLL_/cks/default/_app_/unix
13  rule        _COLL_/cks/default/_app_/pi
14  #
15  rule        /site/cks/team1/default/_app_/gnulinux2/...
16  rule        /site/cks/company/default/_app_/gnulinux2/...
17  rule        /site/cks/vendor/default/_app_/gnulinux2/...
```

FIG. 15

```
1   # knowledge tree containing shared knowledge
2   /home/user/my-cks/shared/shared.cfg
3   /home/user/my-cks/shared/...
4   /home/user/my-cks/app-1/app-1.cfg
5   /home/user/my-cks/app-2/...

6   /site/cks/team/app-1/app-1.cfg
7   /site/cks/team/app-1/datafiles
8   /site/cks/team/...

9   /site/cks/vendor/shared/shared.cfg
10  /site/cks/vendor/shared/...
11  /site/cks/vendor/app-1/...
12  /site/cks/vendor/app-2/...
```

FIG. 16

```
1   /site/cks/company/default/shared/gnulinux2/context.tbl:
2   # company-wide named contexts
3   # name         definition-file
4   default        default.def
5   debug          debug.def 6   /site/cks/company/default/shared/gnulinux2/debug.def:
7   # search rules for customized debug knowledge
8   rule      $HOME/my-cks/debug 9   /site/cks/company/default/shared/gnulinux2/default.def:
10  # default search rules for knowledge
11  rule      $HOME/my-cks/default
12  rule      /site/cks/team/default
13  rule      /site/cks/company/default
14  rule      /site/cks/vendor/default
```

FIG. 17

```
1   # invocation command line context stack
2   someprogram –ctx debug,mine –other args 3   # environment variable context stack
4   CKS_CONTEXTS=debug,mine 5   # a context anchor file named 'context.root'
6   context.root:
7   context   debug
8   context   mine
```

FIG. 18

```
1    virtual-platform.tbl:
2    #
3    #              Specific    Generic    Family    Every
4    # Name         OS          OS         OS        OS
5    #
6    gnulinux2.plt  gnulinux2   gnulinux   unix      pi
7    sol28.plt      sol28       sol        unix      pi
8    win98.plt      win98       win9       win       pi
9    win95.plt      win95       win9       win       pi
10   winnt40.plt    winnt40     winnt      win       pi
11   win2000.plt    win2000     winnt      win       pi
```

FIG. 19

```
1    # search directories for win98 platform
2    /site/cks/team/_app_/win98
3    /site/cks/team/_app_/win9
4    /site/cks/team/_app_/win
5    /site/cks/team/_app_/pi 6    # search directories for gnulinux 2 platform
7    /site/cks/team/_app_/liinux2
8    /site/cks/team/_app_/gnulinux
9    /site/cks/team/_app_/unix
10   /site/cks/team/_app_/pi
```

FIG. 20

```
1    /home/user
2        my-collection
3            cspec
4            s
5                photo.jpg
6                homepage.html
7            cks
8                default/app-1/gnulinux2/data
9                default/app-1/gnulinux/...
10               default/app-1/...
11               default/app-2/gnulinux2/...
12               default/app-3/gnulinux2/...

13               debug/app-1/gnulinux2/...
14               debug/app-2/gnulinux2/...
```

FIG. 21

```
1    # mobile knowledge tree pathnames
2    /home/user/my-collection/cks/default/app-1/gnulinux2/data
3    /home/user/my-collection/cks/default/app-1/gnulinux/data
4    /home/user/my-collection/cks/default/app-1/unix/data
5    /home/user/my-collection/cks/default/app-1/pi/data
6    /home/user/my-collection/cks/default/app-2/gnulinux2/...
7    /home/user/my-collection/cks/default/app-3/gnulinux2/...

8    /home/user/my-collection/cks/debug/app-1/gnulinux2/...
9    /home/user/my-collection/cks/debug/app-2/gnulinux2/...
```

FIG. 22

```
1   /home/user
2     my-workspace
3       cspec
4       s
5         photo.jpg
6         homepage.html
7       cks
8         default/app-1/gnulinux2/...
9         default/app-2/gnulinux2/...
10      parts
11        working-coll-1
12          cspec
13          s
14            photo-1.jpg
15            homepage-2.html
16          cks
17            default/app-1/gnulinux2/...
18        working-coll-2/...
19        working-coll-3/...
```

FIG. 23

```
1   # mobile knowledge
2   rule     _COLL_/cks/default/_app_/gnulinux2/...
3   #
4   # workspace knowledge
5   rule     _WKSPC_/cks/default/_app_/gnulinux2/...

6   _WKSPC_ = /home/user/my-workspace/parts/working-coll-1

7   rule   /home/user/my-workspace/parts/working-coll-1/  +
                   cks/default/_app_/gnulinux2/...
```

FIG. 24

```
1    # aggregated knowledge for project 1
2    /site/agk/p1/...

3    # collections stored in ak-space "p1"
4      p1-data
5        cspec
6        cks
7          default/shared/gnulinux2/...
8          default/app-1/gnulinux2/...
9          debug/app-1/gnulinux2/...

10     p1-client-info
11       cspec
12       cks
13         default/shared/gnulinux2/...
14         debug/default/app-1/gnulinux2/...
15         production/default/app-2/gnulinux2/...

16     p1-coll-types
17       cspec
18       cks
19         default/shared/gnulinux2/...
20         default/app-1/gnulinux2/...
21         default/app-2/gnulinux2/...
```

FIG. 25

```
1    # aggregated knowledge
2    rule     _AKNAME_/_AKCOLL_/cks/default/_app_/gnulinux2/...

3    _AKNAME_ = /site/agk/p1
4    _AKCOLL_ = p1-data 5    rule /site/agk/p1/p1-data/cks/default/shared/gnulinux2/...
```

FIG. 26

```
1   name-akspace.tbl:
2   # a local ak knowledge space name table
3   # name              definition-file
4   agk-p1             agk-p1.def
5   agk-p2             agk-p2.def 6   agk-p1.def:
7   # a local ak knowledge space definition file
8   akspace-root-dir   /site/agk/p1
9   collection         p1-data
10  collection         p1-client-info
11  collection         p1-coll-types
```

FIG. 27

```
1   # invocation akspace stack
2   someprogram –ksp agk-p1,dept1 –other args 3   # environment akspace stack
4   CKS_AKSPACE=agk-p1,dept1

5   # aggregated knowledge stack (a file named 'akspace.root')
6   akspace.root:
7   akspace agk-p1
8   akspace dept1
```

FIG. 28

```
1   # search rules point at root of knowledge trees
2   #
3   # local customized knowledge
4   local    $HOME/my-cks/default/_app_/gnulinux2/...
5   #
6   # local mobile knowledge
7   local    _COLL_/cks/default/_app_/gnulinux2/...
8   #
9   # local workspace knowledge
10  local    _WKSPC_/cks/default/_app_/gnulinux2/...
11  #
12  # local aggregated knowledge
13  local    _AKNAME_/_AKCOLL_/cks/default/_app_/gnulinux2
14  #
15  # remote customized knowledge
16  remote   ktreespace:dns:ktree,vplt=gnulinux2
17  remote   my-cks:dns:team-1,vplt=gnulinux2
18  remote   my-cks:dns:company,vplt=gnulinux2
```

FIG. 29

```
1   name-ktreespace.tbl:
2   # a knowledge treespace name table
3   # name              definition-file
4   my-cks              my-cks.def
5   my-cks-2            my-cks-2.def 6   my-cks.def:
7   # a knowledge treespace definition file
8   # name              k-tree-location
9   my-custom           /remote/my-cks/my-custom
10  team-1              /remote/my-cks/team-1
11  vendor              /remote/my-cks/vendor
```

FIG. 30

```
1    # root of remote aggregated knowledge for project 1
2    /remote/site/agk/p1/...

3    # mobile knowledge collections stored in akspace "p1"
4    p1-data
5        cspec
6        cks
7            default/shared/gnulinux2/...
8            default/app-1/gnulinux2/...
9            debug/app-1/gnulinux2/...

10   p1-client-info
11       cspec
12       cks
13           default/shared/gnulinux2/...
14           debug/default/app-1/gnulinux2/...
15           production/default/app-2/gnulinux2/...

16   p1-coll-types
17   ...
```

FIG. 31

```
1    # remote aggregated knowledge search rule
2    remote   my-aknamespace:dns:akspace=agk-p1,vplt=gnulinux2

3    rule = /remote/site/agk/p1/p1-data/cks/default/shared/gnulinux2/...
4    rule = /remote/site/agk/p1/p1-client-info/...
5    rule = /remote/site/agk/p1/p1-coll-types/...
```

FIG. 32

```
1    name-aknamespace.tbl:
2    # a remote aggregated knowledge namespace name table
3    # name              definition-file
4    my-aknamespace      my-aknamespace.def
5    my-aknamespace-2    my-aknamespace-2.def 6    my-aknamespace.def:
7    # a remote aggregated knowledge namespace definition file
8    # name              definition-file
9    agk-p1              agk-p1.def
10   agk-p2              agk-p2.def 11   agk-p1.def:
12   # a remote aggregated knowledge namespace definition file
13   akspace-root-dir    /remote/site/agk/p1
14   collection          p1-data
15   collection          p1-client-info
16   collection          p1-coll-types
```

FIG. 33

```
1    /home/user:

2    my-ik-coll
3        cspec
4        cks_company
5            default/app-1/pi/d-i/idx-svc.tbl
6            default/app-1/pi/d-i/z-svc/datafiles
7            default/app-2/pi/d-i/idx-app2-data.tbl
8            default/app-2/pi/d-i/z-app2-data/datafiles
```

FIG. 34

```
1    # knowledge tree structure before installable knowledge
2    /site/cks/company/

3    # knowledge tree structure after installable knowledge
4    # installed knowledge goes in  vplt/d-i directory
5    # installed indexes   go in    vplt/d-i/idx-xxx.tbl
6    # installed data files go in   vplt/d-i/z-xxx/datafiles
7    # vplt = a virtual platform
8    /site/cks/company/default/app-1/pi/d-i/idx-svc.tbl
9    /site/cks/company/default/app-1/pi/d-i/z-svc/datafiles
10   /site/cks/company/default/app-2/pi/d-i/idx-app2-data.tbl
11   /site/cks/company/default/app-2/pi/d-i/z-app2-data/datafiles
```

1  /* simplified algorithm for application program using a CKS mgr */
2  Application program requests knowledge from CKS manager
3  CKS Manager retrieves knowledge from knowledge stores
4  CKS Manager returns retrieved knowledge to application
5  Application program uses retrieved knowledge.

1  /* simplified algorithm for CKS manager */
2  Get runtime lookup info such as env variables, etc
3  Build search rules using custom, mobile, etc. knowledge
4  Perform knowledge lookups using search rules
5  Cache, organize and return lookup results

FIG. 39

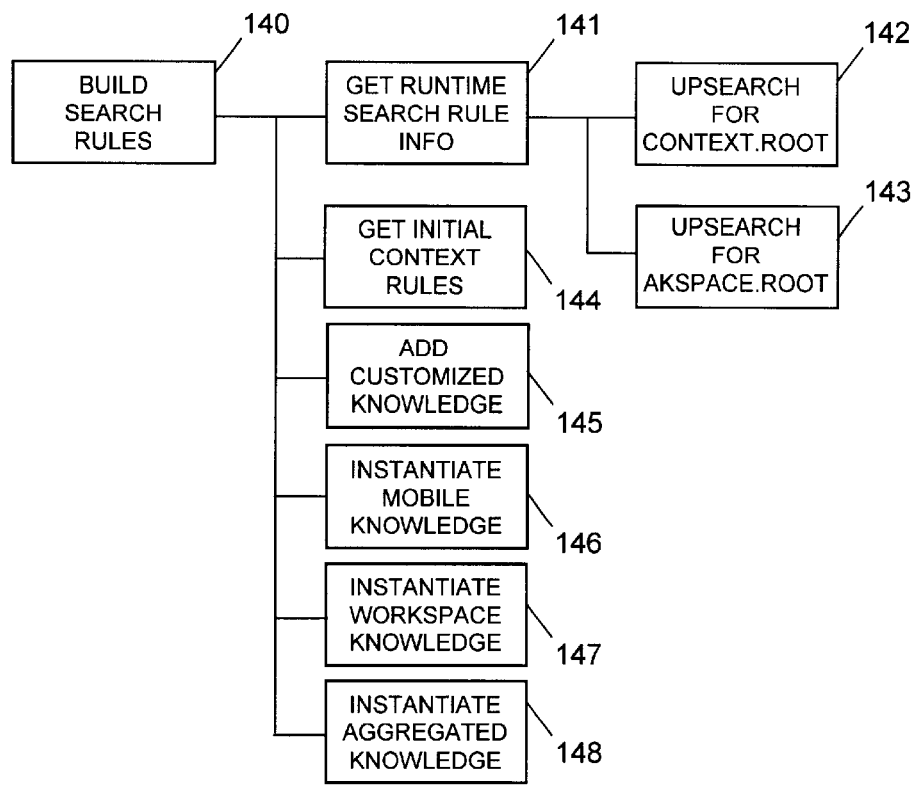

FIG. 40

1  /* simplified algorithm for build search rules */
2  Get runtime context and aggregated knowledge anchor files
3  Get initial context rules
4  Add customized knowledge in form of context stack
5  Instantiate mobile knowledge in form of placeholder rules
6  instantiate workspace knowledge in form of placeholder rules
6  Add aggregated knowledge in form of aggregated knowledge stack

FIG. 41

```
1    CKS=/site/cks/company/default/shared/initial.cfg

2    /site/cks/company/default/shared/initial.cfg:
3    # search rules for customized knowledge
4    rule      $HOME/my-cks/default/...
5    rule      /site/cks/team/default/...
6    rule      /site/cks/company/default/...
7    rule      /site/cks/vendor/default/...

8    /site/cks/company/default/shared/context.tbl:
9    # company-wide named contexts
10   # name         definition-file
11   debug          debug.def
12   mine           mine.def
13   default        default.def 14   /site/cks/company/default/shared/debug.def:
15   # search rules for customized debug knowledge
16   rule      $HOME/my-cks/debug/...

17   /home/user/my-cks/default/shared/mine.def:
18   # search rules for personal custom knowledge
19   rule      $HOME/my-cks/default/...
```

FIG. 42

```
1    # constructed second set of search rules
2    # debug context rules
3    rule      /home/user/my-cks/debug/app-1/gnulinux2/...
4    #
5    # personal customized knowledge
6    rule      /home/user/my-cks/default/app-1/gnulinux2/...
```

FIG. 43

```
1   /site/cks/company/default/shared/default.def:
2   # default search rules for knowledge
3   #
4   # mobile knowledge
5   rule      _COLL_/cks/default/_app_/gnulinux2
6   rule      _COLL_/cks/default/_app_/gnulinux
7   rule      _COLL_/cks/default/_app_/unix
8   rule      _COLL_/cks/default/_app_/pi
9   #
10  # workspace knowledge
11  rule      _WKSPC_/cks/default/_app_/gnulinux2/...
12  #
13  # aggregated knowledge
14  rule      _AKNAME_/_AKCOLL_/cks/default/app-
              1/gnulinux2/...
15  #
16  # customized team, company, and vendor knowledge
17  rule      /site/cks/team/default/_app_/gnulinux2/...
18  rule      /site/cks/company/default/_app_/gnulinux2/...
19  rule      /site/cks/vendor/default/_app_/gnulinux2/...
```

FIG. 44

```
1   # constructed second set of search rules
2   # debug context rules
3   rule       /home/user/my-cks/debug/app-1/gnulinux2/...
4   #
5   # personal customized knowledge
6   rule       /home/user/my-cks/default/app-1/gnulinux2/...
7   #
8   # mobile knowledge
9   rule       /home/user/my-collection/cks/default/app-1/gnulinux2/...
10  #
11  ... other rules
```

FIG. 45

```
1    # aggregated knowledge base directory
2    /site/agk/...

3    # aggregated knowledge for agk-p1
4    /site/agk/p1/...

5    # mobile knowledge collections stored in "agk-p1"
6      p1-data
7          cspec
8          cks
9              default/shared/gnulinux2/...
10             default/app-1/gnulinux2/...
11             debug/app-1/gnulinux2/...

12     p1-client-info
13         cspec
14         cks
15             default/shared/gnulinux2/...
16             debug/app-1/gnulinux2/...
17             production/default/app-2/gnulinux2/...

18     p1-coll-types
19         cspec
20         cks
21             default/shared/gnulinux2/...
22             default/app-1/gnulinux2/...
23             default/app-2/gnulinux2/...
```

FIG. 46

```
1    name-akspace.tbl:
2    # name              definition-file
3    agk-p1              agk-p1.def
4    agk-p2              agk-p2.def 5    agk-p1.def:
6    akspace-root-dir    /site/agk/p1
7    collection          p1-data
8    collection          p1-client-info
9    collection          p1-coll-types
```

FIG. 47

```
1    # constructed second set of search rules
2    # debug context rules
3    rule       /home/user/my-cks/debug/app-1/gnulinux2/...
4    #
5    # personal customized knowledge
6    rule       /home/user/my-cks/default/app-1/gnulinux2/...
7    #
8    # mobile knowledge
9    rule       /home/user/my-coll/cks/default/app-1/gnulinux2/...
10   #
11   # aggregated knowledge
12   rule       /site/agk/p1/p1-data/cks/default/app-1/gnulinux2/...
13   rule       /site/agk/p1/p1-client-info/cks/debug/app-1/gnulinux2/...
14   rule       /site/agk/p1/p1-coll-types/cks/default/app-1/gnulinux2/...
```

FIG. 48

```
1    # constructed second set of search rules
2    # debug context rules
3    rule       /home/user/my-cks/debug/app-1/gnulinux2/...
4    #
5    # personal customized knowledge
6    rule       /home/user/my-cks/default/app-1/gnulinux2/...
7    #
8    # mobile knowledge
9    rule       /home/user/my-coll/cks/default/app-1/gnulinux2/...
10   #
11   # workspace knowledge
12   rule   /home/user/my-workspace/parts/working-coll-1/  +
                  cks/default/app-1/gnulinux2/...
13   #
14   # aggregated knowledge
15   rule       /site/agk/p1/p1-data/cks/default/app-1/gnulinux2/...
16   #
17   # default knowledge, team, company, and vendor
18   rule       /site/cks/team/default/app-1/gnulinux2/...
19   ...
```

```
1   /* simplified algorithm for perform knowledge lookup */
2   Do local lookup
3      Check local cache for previously obtained knowledge
4      If available, use it; if not, look up info and store it in cache
5   Do remote lookup
6      Check remote cache for previously obtained knowledge
7      If available, use it; if not, look up info and store it in cache
8   Return obtained knowledge to caller
```

FIG. 51

```
1    # search rules point at root of knowledge trees
2    #
3    # local context stack (debug) knowledge
4    local    $HOME/my-cks/debug/_app_/gnulinux2/...
5    #
6    # local customized knowledge
7    local    $HOME/my-cks/default/_app_/gnulinux2/...
8    #
9    # local mobile knowledge
10   local    _COLL_/cks/default/_app_/gnulinux2/...
11   #
12   # local workspace knowledge
13   local    _WKSPC_/cks/default/_app_/gnulinux2/...
14   #
15   # local aggregated knowledge
16   local    _AKNAME_/_AKCOLL_/cks/default/_app_/gnulinux2/...
17   #
18   # local default knowledge
19   local    /site/cks/team/default/_app_/gnulinux2/...
20   #
21   # remote customized knowledge
22   remote   my-cks:dns:company,vplt=gnulinux2
23   #
24   # remote aggregated knowledge
25   remote   my-aknamespace:dns:ksp=agk-p1,vplt=gnulinux2
26   #
27   # remote default knowledge
28   remote   my-cks:dns:vendor,vplt=gnulinux2
```

FIG. 53

| | | |
|---|---|---|
| 1 | # lookup API functions that look in all files found | |
| 2 | cks_af_data | return list of files and their contents |
| 3 | cks_af_key_mult | return list of keys (column 1) |
| 4 | cks_af_val_mult | return list of values (column 2) |
| 5 | cks_af_kv_mult | return list of key-value pairs |
| 6 | # API lookup functions that look in the first file found | |
| 7 | cks_ff_data | return contents of one data file |
| 8 | cks_ff_data_bin | return contents of one binary data file |
| 9 | cks_ff_key_mult | return list of keys (column 1) |
| 10 | cks_ff_val_mult | return list of values (column 2) |
| 11 | cks_ff_kv_mult | return list of key-value pairs |
| 12 | cks_ff_kv_one | return one key-value pair |
| 13 | cks_ff_val_one | return one value |

FIG. 54

| | | |
|---|---|---|
| 1 | # parameters required by all lookup functions | |
| 2 | app-name | look up knowledge for this application |
| 3 | file-name | look up this knowledge content file |
| 4 | # parameters required by many functions | |
| 5 | platform-name | look up knowledge for this virtual platform |
| 6 | key-name | look for this key in the knowledge file |

COLLECTION KNOWLEDGE SYSTEM

CROSS REFERENCES TO RELATED APPLICATIONS

The present invention uses inventions from the following patent applications that are filed contemporaneously herewith, and which are incorporated herein by reference: U.S. Ser. No. 09/885,078 Collection Information Manager, Kevin Jameson.

FIELD OF THE INVENTION

This invention relates to automated software systems for processing collections of computer files in arbitrary ways, thereby improving the productivity of software developers, web media developers, and other humans and computer systems that work with collections of computer files.

BACKGROUND OF THE INVENTION

The general problem addressed by this invention is the low productivity of human knowledge workers who use labor-intensive manual processes to work with collections of computer files. One promising solution strategy for this software productivity problem is to build automated systems to replace manual human effort.

Unfortunately, replacing arbitrary manual processes performed on arbitrary computer files with automated systems is a difficult thing to do. Many challenging subproblems must be solved before competent automated systems can be constructed. As a consequence, the general software productivity problem has not been solved yet, despite large industry investments of time and money over several decades.

The present invention provides one piece of the overall functionality required to implement automated systems for processing collections of computer files. In particular, the current invention has a practical application in the technological arts because it provides automated collection processing systems with a means for obtaining useful, context-sensitive knowledge about variant computational processes for processing collections.

Introduction to Process Knowledge

This discussion starts at the level of automated collection processing systems, to establish a context for the present invention. Then the discussion is narrowed down to the present invention, a Collection Knowledge System.

The main goal of automated collection processing systems is to process collections of computer files, by automatically generating and executing arbitrary sequences of computer commands that are applied to the collections.

One critical part of automated collection processing systems is automatically calculating a variant computational process to execute on the current collection. This calculation is quite difficult to carry out in practice, for many significant reasons. One reason is that the computation can be arbitrarily complex. Another reason is that many files can be involved in the computation. Another reason is that many different application programs can be involved in the computation. Another reason is that platform dependent processes can be involved in the computation. Another reason is that various site preferences and policies can be involved in the computation. And so on. The list of complicating factors is long. Generating and executing arbitrary computational processes is a complex endeavor even for humans, let alone for automated collection processing systems.

For communication convenience, this discussion is now narrowed down to focus on the general domain of software development, and in particular on the field of automated software build systems. This is a useful thing to do for several reasons. First, it will ground the discussion in a practical application in the technical arts. Second, it will bring to mind examples of appropriate complexity to readers who are skilled in the art. Third, it will provide several concrete problems that are solved by the present invention. Even though the discussion is narrowed here, readers should keep in mind that automated collection processing systems have a much wider application than only to the particular field of software build systems. The goal of automated collection processing systems is to automatically generate and execute arbitrary computational processes on arbitrary collections of computer files.

Software build processes are good examples for the present invention because they effectively illustrate many of the problem factors described above. That is, software build processes they can be large, complex, customized, platform dependent, and can involve many files and application programs. For example, large multi-platform system builds can easily involve tens of computing platforms, hundreds of different software programs on each platform, and tens of thousands of data files that participate in the build. The automatic calculation and execution of such large software build problems is a challenging task, regardless of whether manual or automated means are used.

One of the most difficult aspects of calculating and executing software builds is accommodating variance in the calculated processes. For example, typical industrial software environments often contain large amounts of process variance in tools, processes, policies, data, and in almost everything else involved in computational processes.

Process variance is difficult to handle even for human programmers, because variance usually requires simultaneous, peaceful, co-existence and co-execution of a plurality of variant instances of complex processes. Peaceful co-existence and co-execution are not easy to achieve within industrial software environments. For example, two variant processes might both use a large customer database that is impractical to duplicate. Or multiple working programs in an existing working process might be incompatible with a required new variant program. And so on. In typical cases, many interacting process issues must be resolved before variant processes of significant size can peacefully coexist in industrial software environments.

As a simple model of variant process complexity, consider a single long strand of colored beads on a string. Beads represent programs, data files, and process steps. Beads can have variant colors, shapes, and versions. Individual beads represent steps in a computational process, individual programs, particular input or output data files, or particular sets of control arguments to particular program beads. Finally, consider that software build problems of medium complexity are represented by several hundreds or thousands of beads on the string.

This bead model can now be used to illustrate how process variance affects complexity. To begin with, it is reasonable to say that most complex industrial software processes must be varied in some way to meet the needs of various computational situations. In the bead model, this is equivalent to saying that most beads on the string will need to be varied at some time, by color, by shape or by version, in order to create a new, particular variant process to meet a new, particular variant software development situation.

As one example, it is often the case that some original data files will be incompatible with a proposed new computing platform bead or a proposed new program bead, requiring that multiple data beads be changed whenever certain platform or program beads are changed. This example illustrates coupling among particular changes within a particular computational process. This example also illustrates the point that it is not always possible to make only one change in a process; in many situations, multiple bead changes must be coordinated in order to create a desired variant computational process.

As a second example of bead model complexity, large industrial software environments can easily contain tens of long product strings and new product version strings, each containing many hundreds or thousands of beads. Further, tens or hundreds of programmers can be continuously improving the various product strings by adding new feature beads, fixing software bug beads, modifying existing feature beads in some way, or cloning, splitting, or merging whole strings of beads. Since each string change must be tested, it follows that many variant combinations of data beads, feature beads, bug fix beads, and process beads must peacefully co-exist together in host industrial software environments for arbitrary periods of time.

Thus it can be seen that automated collection processing systems are not faced with only simple problems involving single complex computational processes. Instead, automated systems face a far more difficult, more general problem that involves whole families of related, complex, coupled, customized, and platform-dependent computational processes.

For each individual computational situation, a competent automated system must calculate, create, and execute a precisely correct variant computational process. In order to do that, automated systems require access to a large amount of variant process knowledge. One mechanism for providing the required knowledge is a Collection Knowledge System, the subject of the present invention.

Problems to be Solved

This section lists several important problems that are faced by automated collection processing systems, and that are solved by the present Collection Knowledge System invention.

The Knowledge Organization Problem is one important problem that must be solved to enable the construction of automated collection processing systems. It is the problem of how to organize knowledge for variant processes, in one place, with one conceptual model, for use by multiple programs in variant processing situations.

Some interesting aspects of the Knowledge Organization Problem are these: an arbitrary number of programs can be involved; an arbitrary amount of knowledge for each program can be involved; knowledge used by programs can have arbitrary structure determined by the program; and knowledge can exist in various binary or textual forms.

The Customized Knowledge Problem is another important problem to solve. It is the problem of how to customize stored knowledge for use in variant processing situations.

Some interesting aspects of the Customized Knowledge Problem are these: knowledge can be customized for arbitrary programs; arbitrary amounts of knowledge can be customized; knowledge can be customized for sites, departments, projects, teams, and for individual people; knowledge can be customized by purpose (for example, debug versus production processes); and various permutations of customized knowledge may even be required.

The Platform-Dependent Knowledge Problem is another important problem. It is the problem of representing platform dependent knowledge in ways that promote human understanding, reduce knowledge maintenance costs, provide easy automated access to stored knowledge, and enable effective sharing of platform dependent knowledge across multiple platforms within particular application programs.

Some interesting aspects of the Platform Dependent Knowledge Problem include these: many platforms may be involved; platforms can be closely or distantly related; platforms can share a little or a lot of information; new platform knowledge is sometimes added; old platform knowledge is sometimes discarded; knowledge can be shared among many or a only few platforms within an application.

The Coupled-Application Knowledge Problem is another important problem. It is the problem of multiple applications being indirectly coupled to each other by their shared use of the same processing knowledge for the same computing purpose. As a consequence of coupling, knowledge changes made for one program may require knowledge changes to be made in other programs. For example, a single knowledge change to enable software "debug" compilations typically requires changes to both compiler and linker control arguments. The compiler is told to insert debugging symbol tables, and the linker is told not to strip symbol tables out of the linked executable file. Thus two bodies of knowledge for two apparently independent programs are coupled by the purpose of debugging.

Some interesting aspects of the Coupled-Application Knowledge Problem are these: multiple applications may be involved in a coupling relationship; applications may be coupled by data file formats, control arguments, or execution sequences; coupling relationships can vary with the current processing purpose; multiple sets of coupled programs may be involved; and multiple coupled processes involving multiple sets of coupled applications may be involved.

The Shared Knowledge Problem is another important problem. It is the problem of how to share knowledge among multiple programs regardless of variant processing purposes or coupling relationships. This problem is not the same as the Coupled-Application Knowledge Problem, which considers indirect coupling among multiple applications according to computational purpose (e.g. debugging). Instead, the Shared Knowledge Problem considers deliberate sharing of knowledge among applications and multiple platforms to reduce multiple copies of the same knowledge.

Some interesting aspects of the Shared Knowledge Problem are these: shared knowledge may be platform dependent; shared knowledge may be customized by site, project, person, purpose, and so on; multiple applications may share one piece of knowledge; and the set of multiple applications that share a piece of knowledge may change with variant processing purpose.

The Scalable Knowledge Delivery Problem is another important problem. It is the problem of how to deliver arbitrary amounts of complex, customized, shared, and platform-dependent knowledge to arbitrary programs, in ways that are resistant to scale up failure.

Some interesting aspects of the Scalable Knowledge Delivery Problem are these: arbitrary amounts of knowledge can be involved; the format of delivered knowledge can be a text string, a text pair, a list, a text or binary file, a set of files, a directory, or even a tree of files; network filesystem mounting methods such as NFS (Network Filesystem System) are sometimes inappropriate or unreliable; frequently used knowledge should be cached for faster retrieval; and cached knowledge must be flushed when the underlying original knowledge is updated or removed.

The Mobile Knowledge Problem is another important problem. It is the problem of how to encapsulate knowledge within a collection, so that knowledge can be shipped around the network in the form of collections of computer (knowledge) files. Importantly, application programs working within the nature filesystem boundaries of the collection directory subtree should be able to use the knowledge stored within the mobile collection. Mobile collections provide an implementation of the idea of location-sensitive knowledge.

Some interesting aspects of the Mobile Knowledge Problem are these: arbitrary amounts of knowledge may be involved; knowledge for multiple programs may be involved; customized knowledge may be involved; variant knowledge may be involved; location-sensitive knowledge should override static knowledge stored in the system if so desired; and mobile knowledge arriving at a site should be installable at the receiving site.

The Workspace Knowledge Problem is another important problem. It is the problem of how to configure a computer filesystem workspace to contain particular sets of hierarchically-organized collections that each contain multiple knowledge files, such that the knowledge files become available to application programs that work within the directory subtree that defines the workspace subtree. Workspaces provide an implementation of the idea of location-sensitive knowledge.

Some interesting aspects of the Workspace Knowledge Problem are these: arbitrary amounts of knowledge can be involved; workspaces lower in the subtree should share or "inherit" knowledge stored above the workspaces in the subtree; knowledge located lower in the subtree should override knowledge located higher in the subtree; and knowledge should become available to programs only when their current working directory is within the workspace subtree.

The Aggregated Knowledge Problem is another important problem. It is the problem of aggregating various smaller bodies of knowledge into larger bodies of knowledge that are intended to serve a particular focus, purpose, area of endeavor, or problem domain.

Some interesting aspects of the Aggregated Knowledge Problem are these: arbitrary amounts of knowledge can be involved; aggregated collections of knowledge should be named for convenient reference; aggregated knowledge can be associated with particular filesystem locations or subtrees; and aggregated knowledge should be accessible by name, independent of filesystem location.

The Installable Knowledge Problem is another important problem. It is the problem of how to create, install, and maintain smaller, named, encapsulated subsets of system knowledge, thereby reducing the complexity of the overall system knowledge management problem.

Some interesting aspects of the Installable Knowledge Problem are these: arbitrary amounts of knowledge can be involved; previously installed knowledge must be uninstalled before newer installable knowledge can be installed; installable knowledge should not be coupled to previously existing knowledge; programs must dynamically detect and use installable knowledge; and uninstallation must cause the flushing of previously cached versions of the old installable knowledge.

As the foregoing material suggests, knowledge management for supporting variant computational processes is a complex problem. Many important issues must be solved in order to create a competent knowledge management and delivery system.

General Shortcomings of the Prior Art

A professional prior art search for the present invention was performed, but produced no meaningful, relevant works of prior art. Therefore the following discussion is general in nature, and highlights the significant conceptual differences between the program-oriented knowledge storage mechanisms of the prior art, and the novel collection-oriented knowledge management mechanisms represented by the present invention.

Prior art approaches lack support for collections. This is the largest limitation of all because it prevents the use of high-level collection abstractions that can significantly improve productivity.

Prior art approaches lack support for managing many simultaneous and different customizations of program knowledge, thereby making it impossible for one set of knowledge to simultaneously serve the needs of many software programs that participate in many variant computational processes.

Prior art approaches lack support for managing the knowledge of coupled application programs in synchronization, thereby making it difficult for humans to coordinate the actions of chains of coupled programs in variant computational processes, and thereby increasing human programming costs.

Prior art approaches lack support for sharing knowledge among multiple unrelated programs, thereby requiring humans to provide each program with its own copy of shared knowledge, and thereby increasing knowledge maintenance costs.

Prior art approaches lack support for using a single scalable means to deliver operational knowledge to many programs within typical industrial software environments, thereby making it more difficult to centrally manage knowledge, and thereby increasing knowledge maintenance costs.

Prior art approaches lack support for partitioning program knowledge into encapsulated subsets of mobile knowledge that can be easily moved around and utilized within a filesystem or computer network. This discourages the sharing and mobility of knowledge, and discourages the use of mobile, location-sensitive knowledge in particular computing situations.

Prior art approaches lack support for associating knowledge with particular directories in filesystem subtrees, thereby making it impossible to configure hierarchical computer workspaces to contain particular sets of knowledge.

Prior art approaches lack support for aggregating smaller bodies of knowledge into larger, named, bodies of knowledge that can be referenced by name or that can be associated with physical filesystem subtrees. This discourages the association of bodies of aggregated knowledge with particular computational problems or computational workspaces.

Prior art approaches lack support for partitioning program knowledge into encapsulated subsets of installable knowledge that can be individually created, installed, and maintained, thereby increasing the monolithic nature of most stored program knowledge, and thereby increasing knowledge creation and maintenance costs.

As can be seen from the above description, prior art mechanisms in general have several important disadvantages. Notably, they do not provide support for collections, coupled applications, shared knowledge, customized knowledge, installable knowledge, or mobile knowledge.

In contrast, the present Collection Knowledge System has none of these limitations, as the following disclosure will show.

Specific Shortcomings in Prior Art

One main example of prior art knowledge delivery systems is the common technique of storing application program data on a local hard disk, where it can be accessed by an application program.

For example, preference options for spreadsheets and word processors on personal computers are generally stored using this technique. It is fair to say that historically, this particular approach has been the main approach used by the industry to store application program knowledge.

However, as described previously, this approach has many significant limitations with respect to supporting applications that participate in variant computational processes. Indeed, it is fair to say that this simple approach is one of the main causes of difficulty in treating variant processes, for all the reasons listed earlier.

For example, this prior art approach limits the sharing of knowledge among applications. It cannot represent the idea of coupled applications. It cannot associate variant processes with relevant knowledge. It cannot represent different customizations of application knowledge. And so on.

As can be seen from the above description, the main prior art approach used within the software industry has many significant limitations. Most importantly, it is oriented toward storing knowledge for single, isolated applications. It cannot represent knowledge for entire variant processes, and cannot use a combination of customized knowledge from many different application programs to satisfy the knowledge needs of entire variant processes.

In contrast, the present Collection Knowledge System invention has none of these limitations, as the following disclosure will show.

SUMMARY OF THE INVENTION

A Collection Knowledge System provides context-sensitive knowledge delivery services to application programs, thereby enabling application programs to better work with variant computational processes.

In operation, a Collection Knowledge System receives knowledge requests from application programs, performs local and remote lookups into structured trees of knowledge, and finally returns the obtained knowledge to the requesting programs.

Importantly, requested knowledge is retrieved using customizable search rules, thereby making it possible to override default knowledge values with higher-precedence knowledge values.

Collection Knowledge Systems can store and deliver customized knowledge for entire variant computational processes, thereby enabling automated collection processing systems and individual application programs to calculate, create, and execute complex variant computational processes in automated, scalable ways that were not previously possible.

OBJECTS AND ADVANTAGES

The main object of the present Collection Knowledge System invention is to manage the knowledge of entire, industrial-strength variant processes that involve many application programs and data files. The present Collection Knowledge System invention enables humans and automated programs to work with knowledge at the variant process level, rather than at the individual program level, thereby significantly improving human productivity by automatically processing variant computational process knowledge in ways that were not previously possible.

Another object is to provide a general, scalable, and automated Collection Knowledge System, thereby promoting the construction of general and scalable automated collection processing systems.

Another object is to provide support for representing and sharing platform dependent knowledge, thereby making it possible for collection knowledge systems that execute on one computing platform to serve up knowledge for many computing platforms.

Another object is to provide support for customized knowledge, thereby making it possible for humans to store customized company, department, project, team, individual, and purpose-oriented policy decisions within a collection knowledge system.

Another object is to provide support for context-sensitive knowledge, thereby making it possible to aggregate and utilize particular knowledge for particular variant processes, using symbolic context names that are associated with those variant processes.

Another object is to provide support for an automated, scalable, centralized means of managing variant process knowledge, thereby promoting increased sharing of knowledge within the central storage system, promoting increased convenience for customizing knowledge according to desired operational policies, and promoting decreased knowledge maintenance costs.

Another object is to provide support for mobile knowledge, whereby process knowledge is stored within a collection subtree on a filesystem where it can be accessed in a location-sensitive way by programs operating within the directory subtree containing the collection. Mobile knowledge mechanisms encapsulate variant computational process knowledge into mobile collections that can be transported across networks and installed into remote knowledge systems.

Another object is to provide support for workspace knowledge, whereby knowledge in the form of mobile collections is stored in a hierarchical way within a computer filesystem, thereby creating a physical computer workspace containing particular bodies of knowledge at particular locations within the computer filesystem subtree, and thereby enabling locations within the tree to "inherit" knowledge located above them within the subtree.

Another object is to provide support for aggregated knowledge, whereby knowledge in the form of mobile collections is aggregated into named sets of knowledge that can be referenced by name, or that can be associated with physical filesystem subtrees, thereby enabling application programs to access large bodies of knowledge that are specifically related to the location, purpose, or computational situation at hand.

Another object is to provide support for partitioned subsets of process knowledge in the form of installable knowledge collections, thereby enabling custom knowledge for an entire particular variant process to be stored within a single collection, and also thereby enabling the convenient installation and management of the installable knowledge.

As can be seen from the objects above, collection knowledge systems can provide many useful services to both humans and programs that process collections of computer files. Collection Knowledge Systems can significantly improve human productivity by supporting the automatic calculation, creation, and execution of complex variant computational processes, in scalable, automated ways that were not previously possible.

Further advantages of the present Collection Knowledge System invention will become apparent from the drawings and disclosures that follow.

BRIEF DESCRIPTION OF DRAWINGS

FIG. 1 shows a sample prior art filesystem folder in a typical personal computer filesystem.

FIG. 2 shows how a portion of the prior art folder in FIG. 1 has been converted into a collection 100 by the addition of a collection specifier file 102 named "cspec" FIG. 2 Line 5.

FIG. 3 shows an example physical representation of a collection specifier 102, implemented as a simple text file such as would be used on a typical personal computer filesystem.

FIG. 4 shows four major information groupings for collections, including collection type definition 101, collection specifier 102, collection content 103, and collection 100.

FIG. 5 shows a more detailed view of the information groupings in FIG. 4, illustrating several particular kinds of per-collection-instance and per-collection-type information.

FIG. 8 shows an example software collection datastructure that relates collection specifier and collection content information for a single collection instance.

FIG. 9 shows an example collection type definition datastructure, such as might be used by software programs that process collections.

FIG. 10 shows a more detailed example of the kinds of information found in collection type definitions.

FIG. 11 shows a basic knowledge tree structure that stores knowledge for two application programs, "app-1" and "app-2".

FIG. 12 shows an example set of knowledge trees that store knowledge for a user, a team, a department, a company, and a vendor.

FIG. 13 shows an example set of search rules for locating knowledge within the trees of FIG. 12.

FIG. 14 shows examples of both static and dynamic search rules.

FIG. 15 shows knowledge trees containing shared knowledge.

FIG. 16 shows an example context name table containing two named contexts "default" and "debug".

FIG. 17 shows how context stacks can be specified in command lines, environment variables, or in context anchor files.

FIG. 18 shows an example virtual platform name table.

FIG. 19 shows an example of how virtual platforms can be used in search rules to find platform-dependent knowledge before platform independent knowledge.

FIG. 20 shows a mobile knowledge collection that contains an internal knowledge tree structure.

FIG. 21 shows pathnames corresponding to the mobile knowledge tree shown in FIG. 20.

FIG. 22 shows an example of workspace knowledge comprised of several nested mobile knowledge collections.

FIG. 23 shows how an example search rule is built for the collection tree of FIG. 22.

FIG. 24 shows an example aggregated knowledge space comprised of several mobile collections.

FIG. 25 shows an example search rule expansion for the aggregated knowledge space of FIG. 24.

FIG. 26 shows an example aggregated knowledge space name table.

FIG. 27 shows how knowledge space stacks can be specified in command lines, environment variables, or in knowledge space anchor files.

FIG. 28 shows an example second set of constructed search rules containing generic rules for context, mobile, workspace, aggregated, and remote knowledge.

FIG. 29 shows an example knowledge treespace name table and an example knowledge treespace definition file.

FIG. 30 shows an example physical directory structure for a remote aggregated knowledge space.

FIG. 31 shows an example search rule containing a remote aggregated knowledge lookup expression.

FIG. 32 shows a name table and several definition files for remote aggregated knowledge names spaces.

FIG. 33 shows an example collection containing installable knowledge.

FIG. 34 shows an example custom "company" knowledge tree before and after an installable knowledge installation operation.

FIG. 39 shows a simplified architecture for a Build Search Rules module 140.

FIG. 40 shows a simplified algorithm for a Build Search Rules module 140.

FIG. 41 shows how a second set of search rules can be constructed from various environment variables, tables, and definition files.

FIG. 42 shows the beginnings of an example second set of constructed search rules.

FIG. 43 shows an example context definition file for the "default" context.

FIG. 44 shows a second set of search rules where placeholder strings have been replaced with specific values for the current knowledge request.

FIG. 45 shows an example of aggregated knowledge in the form of an aggregated knowledge space named "agk-p1."

FIG. 46 shows an example aggregated knowledge space name table and an example aggregated knowledge space definition file.

FIG. 47 shows an example second set of constructed search rules with aggregated knowledge rules included.

FIG. 48 shows a second set of constructed search rules containing search rules for the "debug", "mine", and "default" contexts, and after rules for mobile, workspace, and aggregated knowledge have been added to the rule set.

FIG. 51 shows an example second set of uninstantiated search rules that contains examples of all search rules previously discussed.

FIG. 53 shows a list of example software functions for performing various kinds of lookups.

FIG. 54 shows a list of example parameters used by the lookup functions shown in FIG. 53.

LIST OF DRAWING REFERENCE NUMBERS

Figure 6:
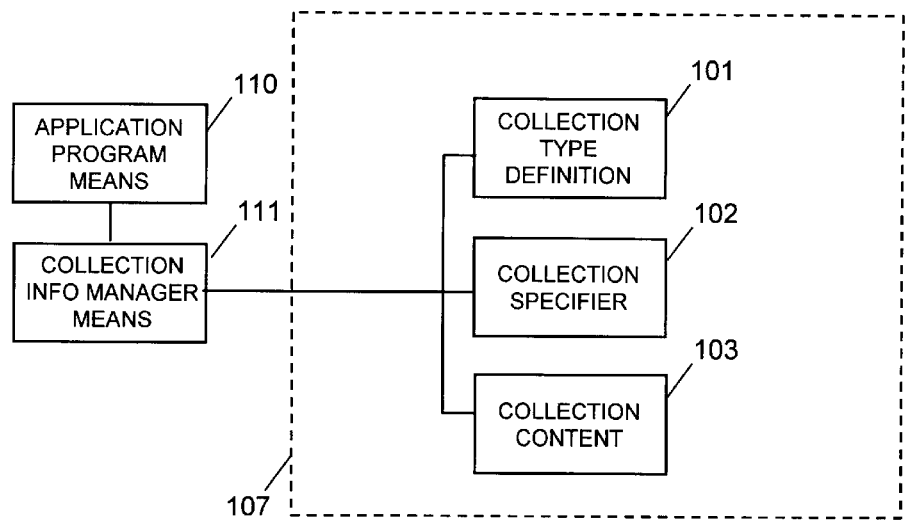
FIG. 6 shows a logical diagram of how a Collection Information Manager Means 111 would act as an interface between an application program means 110 and a collection information means 107, including collection information sources 101–103.

100 A collection formed from a prior art folder
101 Collection type definition information
102 Collection specifier information
103 Collection content information
104 Per-collection collection processing information
105 Per-collection collection type indicator
106 Per-collection content link specifiers
107 Collection information
110 Application program means
111 Collection information manager means
112 Collection type definition API means
113 Collection specifier API means
114 Collection content API means
115 Collection type definition server means
116 Collection specifier server means
117 Collection content server means
120 Application collection processing program
121 Local knowledge stores
122 Collection Knowledge System
130 Collection knowledge system manager module
131 Get runtime information module
132 Organize and return results module
140 Build search rules module
141 Get runtime search rule information module
142 Upsearch for context.root module
143 Upsearch for akspace.root module
144 Get initial context rules module
145 Add customized knowledge module
146 Instantiate mobile knowledge module
147 Instantiate workspace knowledge module
148 Instantiate aggregated knowledge module
150 Perform knowledge lookups module
151 Do local lookup module
152 Local cache manager module
153 Do remote lookup module
154 Remote cache manager module
160 Collection knowledge system client module
170 Collection knowledge system server module
171 Remote knowledge stores

DETAILED DESCRIPTION

Overview of Collections

This section introduces collections and some related terminology.

Collections are sets of computer files that can be manipulated as a set, rather than as individual files. Collection information is comprised of three major parts: (1) a collection specifier that contains information about a collection instance, (2) a collection type definition that contains information about how to process all collections of a particular type, and (3) optional collection content in the form of arbitrary computer files that belong to a collection.

Collection specifiers contain information about a collection instance. For example, collection specifiers may define such things as the collection type, a text summary description of the collection, collection content members, derivable output products, collection processing information such as process parallelism limits, special collection processing steps, and program option overrides for programs that manipulate collections. Collection specifiers are typically implemented as simple key-value pairs in text files or database tables.

Collection type definitions are user-defined sets of attributes that can be shared among multiple collections. In practice, collection specifiers contain collection type indicators that reference detailed collection type definitions that are externally stored and shared among all collections of a particular type. Collection type definitions typically define such things as collection types, product types, file types, action types, administrative policy preferences, and other information that is useful to application programs for understanding and processing collections.

Collection content is the set of all files and directories that are members of the collection. By convention, all files and directories recursively located within an identified set of subtrees are usually considered to be collection members. In addition, collection specifiers can contain collection content directives that add further files to the collection membership. Collection content is also called collection membership.

Collection is a term that refers to the union of a collection specifier and a set of collection content.

Collection information is a term that refers to the union of collection specifier information, collection type definition information, and collection content information.

Collection membership information describes collection content.

Collection information managers are software modules that obtain and organize collection information from collection information stores into information-rich collection data structures that are used by application programs.

Collection Physical Representations—Main Embodiment

FIGS. 1–3 show the physical form of a simple collection, as would be seen on a personal computer filesystem.

FIG. 1 shows an example prior art filesystem folder from a typical personal computer filesystem. The files and directories shown in this drawing do not implement a collection 100, because no collection specifier 102, FIG. 2 Line 5 exists to associate a collection type definition FIG. 4 101 with collection content information FIG. 4 103.

FIG. 2 shows the prior art folder of FIG. 1, but with a portion of the folder converted into a collection 100 by the addition of a collection specifier file FIG. 2 Line 5 named "cspec". In this example, the collection contents FIG. 4 103 of collection 100 are defined by two implicit policies of a preferred implementation.

First is a policy to specify that the root directory of a collection is a directory that contains a collection specifier file. In this example, the root directory of a collection 100 is a directory named "c-myhomepage" FIG. 2 Line 4, which in turn contains a collection specifier file 102 named "cspec" FIG. 2 Line 5.

Second is a policy to specify that all files and directories in and below the root directory of a collection are part of the collection content. Therefore directory "s" FIG. 2 Line 6, file "homepage.html" FIG. 2 Line 7, and file "myphoto.jpg" FIG. 2 Line 8 are part of collection content FIG. 4 103 for said collection 100.

FIG. 3 shows an example physical representation of a collection specifier file 102, FIG. 2 Line 5, such as would be used on a typical personal computer filesystem.

Collection Information Types

FIGS. 4–5 show three main kinds of information that comprise collection information.

FIG. 4 shows a high-level logical structure of three types of information that comprise collection information: collection processing information 101, collection specifier information 102, and collection content information 103. A logical collection 100 is comprised of a collection specifier 102 and collection content 103 together. This diagram best illustrates the logical collection information relationships that exist within a preferred filesystem implementation of collections.

FIG. 5 shows a more detailed logical structure of the same three types of information shown in FIG. 4. Collection type definition information FIG. 4 101 has been labeled as per-type information in FIG. 5 103 because there is only one instance of collection type information 101 per collection type. Collection content information FIG. 4 103 has been labeled as per-instance information in FIG. 5 103 because there is only one instance of collection content information per collection instance. Collection specifier information 102 has been partitioned into collection instance processing information 104, collection-type link information 105, and collection content link information 106. FIG. 5 is intended to show several important types of information 104–106 that are contained within collection specifiers 102.

Suppose that an application program means FIG. 6 110 knows (a) how to obtain collection processing information 101, (b) how to obtain collection content information 103, and (c) how to relate the two with per-collection-instance information 102. It follows that application program means FIG. 6 110 would have sufficient knowledge to use collection processing information 101 to process said collection content 103 in useful ways.

Collection specifiers 102 are useful because they enable all per-instance, non-collection-content information to be stored in one physical location. Collection content 103 is not included in collection specifiers because collection content 103 is often large and dispersed among many files.

All per-collection-instance information, including both collection specifier 102 and collection content 103, can be grouped into a single logical collection 100 for illustrative purposes.

Collection Application Architectures

Figure 7:
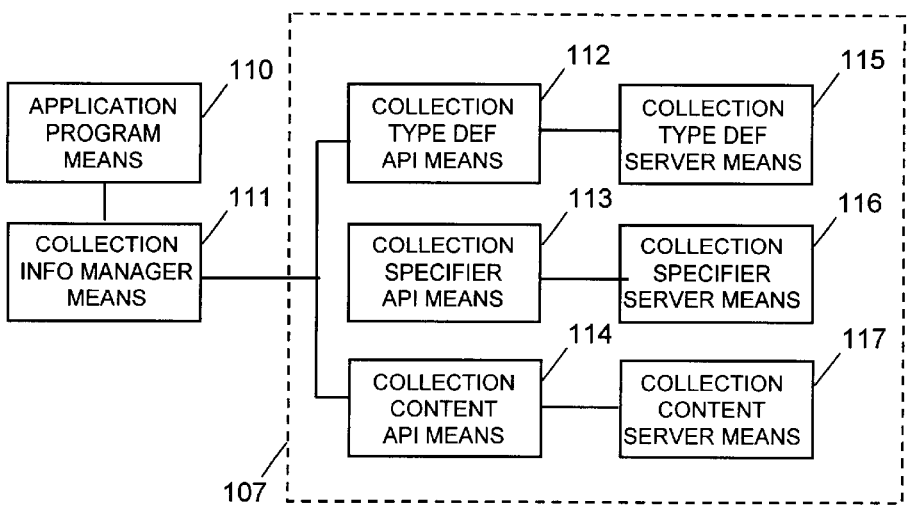
FIG. 7 shows a physical software embodiment of how an Application Program Means 110 would use a Collection Information Manager Means 111 to obtain collection information from various collection information API means 112–114 connected to various collection information server means 115–117.

FIGS. 6–7 show example collection-enabled application program architectures.

FIG. 6 shows how a collection information manager means 111 acts as an interface between an application program means 110 and collection information means 107 that includes collection information sources 101–103. Collectively, collection information sources 101–103 are called a collection information means 107. A collection information manager means 111 represents the union of all communication mechanisms used directly or indirectly by an application program means 110 to interact with collection information sources 101–103.

FIG. 7 shows a physical software embodiment of how an application program means 110 could use a collection information manager means 111 to obtain collection information from various collection information API (Application Programming Interface) means 112–114 connected to various collection information server means 115–117.

Collection type definition API means 112 provides access to collection type information available from collection type definition server means 115. Collection specifier API means 113 provides access to collection specifier information available from collection specifier server means 116. Collection content API means 114 provides access to collection content available from collection content server means 117.

API means 112–114, although shown here as separate software components for conceptual clarity, may optionally be implemented wholly or in part within a collection information manager means 111, or within said server means 115–117, without loss of functionality.

API means 112–114 may be implemented by any functional communication mechanism known to the art, including but not limited to command line program invocations, subroutine calls, interrupts, network protocols, or file passing techniques.

Server means 115–117 may be implemented by any functional server mechanism known to the art, including but not limited to database servers, local or network file servers, HTTP web servers, FTP servers, NFS servers, or servers that use other communication protocols such as TCP/IP, etc.

Server means 115–117 may use data storage means that may be implemented by any functional storage mechanism known to the art, including but not limited to magnetic or optical disk storage, digital memory such as RAM or flash memory, network storage devices, or other computer memory devices.

Collection information manager means 111, API means 112–114, and server means 115–117 may each or all optionally reside on a separate computer to form a distributed implementation. Alternatively, if a distributed implementation is not desired, all components may be implemented on the same computer.

Collection Data Structures

FIGS. 8–10 show several major collection data structures.

FIG. 8 shows an example collection datastructure that contains collection specifier and collection content information for a collection instance. Application programs could use such a datastructure to manage collection information for a collection that is being processed.

In particular, preferred implementations would use collection datastructures to manage collection information for collections being processed. The specific information content of a collection datastructure is determined by implementation policy. However, a collection specifier typically contains at least a collection type indicator FIG. 8 Line 4 to link a collection instance to a collection type definition.

FIG. 9 shows an example collection type definition datastructure that could be used by application programs to process collections. Specific information content of a collection type definition datastructure is determined by implementation policy. However, collection type definitions typically contain information such as shown in FIGS. 9–10.

FIG. 10 shows example information content for a collection type definition datastructure such as shown in FIG. 9. FIG. 10 shows information concerning internal collection directory structures, collection content location definitions, collection content datatype definitions, collection processing definitions, and collection results processing definitions. The specific information content of a collection type definition is determined by implementation policy. If desired, more complex definitions and more complex type definition information structures can be used to represent more complex collection structures, collection contents, or collection processing requirements.

Knowledge Terminology

This section defines various terms used in this document. Each of these kinds of knowledge is explained in detail later in this document.

Knowledge is a term that refers to information that is stored in a Collection Knowledge System (CKS system) for use by application programs. Stored knowledge can include program control information, template files, type definition information, or in general, any information that is useful to an application program in producing desired application results.

Knowledge tree is a term that refers to a hierarchical organization of information, such as a tree of directories and files on a computer disk, or a logical tree of information stored as hierarchically related tables and records in a computer database.

Knowledge tree namespace is a term that refers to a set of named knowledge trees. Knowledge tree namespaces have names by which they can be referenced.

Customized knowledge is a term that refers to knowledge accessed by search rules that impose a precedence ordering on requested knowledge. For example, in a linear search rule implementation, the first knowledge found according to the search rules used would have a higher precedence than subsequent occurrences of the same knowledge. Thus the first knowledge found is said to be a customized version of the default, later-found knowledge.

Shared knowledge is a term that refers to knowledge shared among a plurality of application programs. No particular program "owns" such knowledge, since it is a shared resource.

Context knowledge is a term that refers to knowledge found using a particular named set of customized search rules that define a context. A context is a set of search rules that specify an ordered sequence of places to look for requested knowledge. For example, a "debug" context would specify knowledge search rules that gave precedence to special pieces of knowledge for supporting debugging activities.

Platform dependent knowledge is a term that refers to knowledge that varies with computing platform. Thus an application program using platform dependent knowledge would normally expect different platforms to return different knowledge results from the same original knowledge request.

Mobile knowledge is a term that refers to knowledge that is both stored and accessible in a mobile collection. The main idea of mobile knowledge is that collections can contain knowledge that can be easily moved around a network, and that can be used by application programs located at receiving locations. In this approach, application knowledge becomes a commodity resource that can be stored, shipped, and used in essentially the same way as other common computer files. Mobile knowledge can be used as a pure knowledge customization mechanism, as a pure knowledge extension mechanism, or as a combination of both, depending on the precedence positioning of mobile knowledge trees in a set of search rules. The main intent of mobile knowledge is to act as a knowledge extension mechanism.

Workspace Knowledge is a term that refers to knowledge that is contained within a hierarchically organized set of mobile knowledge collections. The main idea of workspace knowledge is to associate mobile knowledge collections with particular directories and subtrees in computer filesystems, thereby making it possible for humans to create physical, hierarchical subtree workspaces that contain knowledge relevant to the computational tasks performed at various levels within the hierarchical workspaces.

Aggregated knowledge is a term that refers to knowledge that is contained within named sets of mobile knowledge collections, or "knowledge spaces." Aggregated knowledge can be used as a pure knowledge customization mechanism, as a pure knowledge extension mechanism, or as a combination of both techniques. The main intent of aggregated knowledge is to act as a knowledge extension mechanism.

Remote knowledge is a term that refers to knowledge that is stored remotely on a network, and that is accessed using a network program or network protocol. A good example of remote knowledge is the remote knowledge contained in a client-server CKS system, such as the one described later in this document. Two important advantages of remote knowledge are that it encourages centralized administration and widespread sharing of the remote knowledge.

Remote aggregated knowledge is a term that refers to aggregated knowledge that is provided by a remote knowledge delivery system. For example, aggregated knowledge that is stored on a server in a client-server CKS system is remote aggregated knowledge. Remote server-side aggregated knowledge is implemented identically to local client-side aggregated knowledge, and indeed, appears as local aggregated knowledge to the server program.

Installable knowledge is a term that refers to encapsulated mobile knowledge that can be easily installed into, and be uninstalled from, a knowledge delivery system. The main advantage of installable knowledge is that it partitions large knowledge sets into more easily managed subsets of knowledge that are conveniently contained within mobile installable knowledge collections.

Cached knowledge is a term that refers to knowledge that has been added to a computer memory cache for increased system performance.

Knowledge Types and Search Rules

This section describes several types of knowledge used by the present Collection Knowledge System invention, and shows how various kinds of knowledge can be represented and accessed by search rules.

Fundamental Knowledge Organization

The present Collection Knowledge System invention fundamentally organizes knowledge into hierarchical trees, because trees help to separate knowledge used by multiple application programs within one physical location. For example, FIG. 11 shows a knowledge tree structure that stores knowledge for two application programs, "app-1" and "app-2". Further examples will expand the simple tree structure of FIG. 11 with further levels of abstraction.

Tree structures are both a simple and preferred mode of implementation, but databases using tables and records are also possible. Those skilled in the art will understand that both approaches have advantages and disadvantages, leading to various tradeoffs for each implementation.

Search Rules and Knowledge Precedence

Because any one set of knowledge cannot meet all computational situations over time, knowledge delivery systems must provide means for customizing and extending the default knowledge content of a knowledge system.

The present CKS invention uses search rules as a mechanism for both customizing and extending stored knowledge. Search rules are comprised of one or more directory pathnames that tell a knowledge system where to look for knowledge files. Application programs traverse a list of search rules, looking in successive search directories to find the desired knowledge in particular knowledge files.

FIG. 12 shows an example set of knowledge trees that store knowledge for a user, a team, a department, a company, and a vendor. FIG. 13 shows an example set of search rules for locating knowledge within the trees of FIG. 12.

New search rules are added to a list of search rules for two main reasons.

The first reason is to customize the existing set of knowledge files. In this case, a newly added search rule should specify a directory that contains customized versions of existing knowledge files. The new search rule must appear early enough in the list of search rules to ensure that the desired "customized" versions of knowledge files are found before non-customized versions of the knowledge files.

The second reason is to extend the set of knowledge files that can be accessed using the search rules. In this case, the added search rule should point at a directory that contains knowledge files that are not available through any other search rule. Thus the total set of knowledge files accessible through the search rules is extended.

FIG. 13 shows a set of search rules that establish a relative precedence order among the directories shown in FIG. 12. In particular, the search rules of FIG. 13 give highest knowledge precedence to personal user knowledge and team knowledge, in that order, and lowest precedence to company and vendor knowledge, again in that order. This precedence is not required; other precedence orderings could be equally valid for other computational situations. Particular search rule list memberships and orderings are determined by implementation policy.

In summary, search rules provide a means for both customizing and extending the knowledge stored in a Collection Knowledge System system. By controlling the membership and ordering of rules within a search rule list, humans and applications can ensure that the desired knowledge files will be found during a search. This is an important point. Search rules have a large and consequential effect on the utility and outputs of knowledge delivery systems.

Static and Dynamic Search Rules

Search rules can be dynamic or static in nature. Static search rules are fixed in nature and do not vary over long periods of time, so they can be precisely specified as valid "hardcoded" directory pathnames in search rules. In contrast, dynamic search rules do vary over time and are temporary in nature. Thus they cannot be precisely specified as hardcoded directory pathnames in search rules.

Instead, dynamic search rules are best represented by partially specified directory pathnames that contain placeholder strings. Placeholder strings are replaced at runtime with values appropriate for the current knowledge request, thereby forming a complete and valid directory pathname for use as a search rule.

FIG. 14 shows examples of both static and dynamic search rules. Lines 1–6 show examples of static search rules. Lines 7–17 show examples of dynamic search rules that contain placeholder strings.

For example, in Line 8, the placeholder string "$HOME" would be replaced at runtime by the home directory of the person (actually, of the login account) that was using the search rules. In Line 8 also, the placeholder string "__app__" would be replaced at runtime by the name of the application program under which requested knowledge was stored. In Line 10, the placeholder string "__COLL__" would be replaced at runtime by the name of the current mobile collection, if any, that was being processed by the application program.

Dynamic search rules provide a powerful mechanism for adapting search rules, and thus the searched set of knowledge, to the particular computational situation that is in progress at search time.

Extending and Customizing Knowledge

Individual search rules can be used to extend knowledge, to customize knowledge, or to do a combination of both. Specifically, to extend knowledge, a search rule should make new knowledge files available. To customize knowledge, a search rule should make customized versions of existing knowledge files available. To both extend and customize at once, a search rule should make both new knowledge files and customized files available.

In preferred implementations, using one search rule to both extend and customize knowledge may have the undesirable side effect of coupling the extended and customized knowledge to each other. This complicates overall system knowledge management. In such a case, neither the pure extension knowledge nor the pure customization knowledge can be independently used. Both types of knowledge must travel together, since they are coupled by virtue of being in the same knowledge tree, referenced by one search rule. Having said this, the particular knowledge content provided by a search rule is determined by implementation policy, so mixed combinations of extension and customization knowledge may well be used together if implementation policy so dictates.

Overview of Search Rule Construction

This section describes the overall mechanism of constructing lists of search rules. The main goal of constructing search rule lists is to ensure that the final list provides access to the desired knowledge set, and that the order of search rules provides the desired knowledge precedence relationships.

Search rules for customizing knowledge should appear first in the search rule list, so that customized knowledge is found first. Afterwards, search rules that extend or provide the default knowledge set can follow in any suitable order determined by implementation policy.

This document discusses construction by starting with customization search rules, appending other rules, and finishing with rules for the default knowledge set. Readers skilled in the art will immediately appreciate that the list could also be constructed in reverse, starting with the default set, prepending extension rules, and finishing with customization rules. Both approaches are valid.

A useful general association can be made between search rules and knowledge types, assuming the use of preferred implementation policies that do not combine both knowledge extension and customization activities within individual search rules.

In particular, the following knowledge types are generally associated with search rules: customized, context, mobile, workspace, aggregated, and remote knowledge. Knowledge types are explained later in this document.

Search rules for customized and context knowledge are generally used to customize system knowledge. Search rules for mobile, workspace, aggregated, and remote knowledge are generally used to extend system knowledge.

The discussion will now introduce various types of knowledge.

Customized Knowledge

The main idea of customized knowledge is to override existing knowledge values with customized values that are preferred by particular knowledge requests. Customized knowledge is important because it is one of the primary mechanisms for representing variant process knowledge.

For example, customized knowledge is useful for representing debugging knowledge, test case knowledge, new versions of knowledge, personal knowledge workspaces, and for representing the use of customized programs, data sets, preferences, and so on.

Search rules are the main technical mechanism for implementing customized knowledge.

Shared Knowledge

The main idea of shared knowledge is to share common knowledge among multiple application programs that each require access to the shared knowledge. Shared knowledge reduces complexity and knowledge maintenance costs by sharing one copy of information, in comparison to the alternative, which is to maintain multiple copies of the same information.

The main technical mechanism for sharing knowledge is the use of a virtual application program name in the fundamental knowledge tree structure. FIG. 15 Lines 2–3 and Lines 9–10 show knowledge trees containing shared knowledge.

In practice, application programs look up shared knowledge by using the name of the shared information directory instead of using the name of the directory containing their own application data.

Context Knowledge

The main idea of context knowledge is to give names to particular sets of search rules, so that search rule lists can be constructed with the help of conveniently named blocks of search rules that represent particular ideas or computational situations.

For example, rules in a context named "debug" could point to directories containing useful debugging knowledge values. Rules in another context named "production" could point to directories containing knowledge values that were optimized for high-performance software production processes.

FIG. 16 shows a context name table containing two named contexts "default" and "debug". Line 1 shows the physical location of the context table. Line 5 associates the "debug" context name with a context definition file named "debug.def". Lines 6–8 show the contents of the "debug.def" context definition file. Lines 9–14 show a context definition file containing several search rules for the "default" context.

Once contexts have been defined, they can be combined into context stacks that mirror their desired position in a constructed search rule list.

FIG. 17 shows how context stacks can be specified in command lines, environment variables, and in context anchor files (anchor files are explained later in this document). All three examples in FIG. 17 specify a two-context stack, with the "debug" context having precedence over the "mine" context. The "default" context is always implicitly added to the end of all context stacks, so there is no need to explicitly include it in context stack expressions.

When a final search rule list is constructed, all search rules in the "debug" context will appear in the final list before all search rules in the "mine" context, thereby implementing the desired search rule precedence specified in the original context stack expressions.

Platform Dependent Knowledge

The main idea of platform dependent knowledge is to vary knowledge by computing platform within an application knowledge set. This is a very useful thing to do because many knowledge values used in variant computational processes vary by computing platform.

For example, the following things often vary by platform in commercial software environments: application programs, filenames and suffixes, command line options, data formats, build processes, link libraries used, products built, and so on.

The main technical means for supporting platform dependent knowledge is the use of virtual platforms within knowledge tree structures. A virtual platform is a symbolic name for a platform. FIG. 18 shows an example virtual platform name table that specifies the names of several virtual platforms in Column 1. Virtual platform names are normally chosen by users or defined by implementation policy.

FIG. 18 Columns 2–5 represent increasing levels of platform abstraction, from most platform specific (Column 2) to least platform specific (Column 5, platform independent). FIG. 19 shows an example of how virtual platforms can be used in search rules to find platform-dependent knowledge before shared platform independent knowledge. FIG. 14 Lines 10–13 show another example of how virtual platforms can be used in dynamic search rules.

Platform dependent knowledge helps to reduce knowledge complexity and maintenance costs by sharing knowledge among virtual platforms within individual application programs. Note that sharing of knowledge among platforms within an application program is not the same as sharing arbitrary knowledge among multiple application programs, which was described earlier.

Knowledge can be shared at any appropriate virtual platform level within FIG. 18 Columns 2–5. For example, knowledge that was appropriate for all platforms for an application could be placed in a platform-independent "pi" subdirectory (Column 5) of a knowledge tree. Knowledge that was appropriate for all unix platforms could be placed in a "unix" subdirectory (Column 4) of a knowledge tree, and so on.

Mobile Knowledge

There are two main ideas associated with mobile knowledge.

The first main idea of mobile knowledge is to encapsulate a knowledge tree structure within a collection, so that the encapsulated knowledge can then become as mobile as collections are, and can be transported around filesystems and networks for use at receiving locations.

The second main idea of mobile knowledge is to dynamically extend the amount of knowledge that is accessible by an application program at a receiving location. This goal is achieved by dynamically adding search rules to point to encapsulated knowledge trees within mobile collections.

The first idea, encapsulation, is achieved technically by placing the desired knowledge tree within the collection. FIG. 20 shows a collection containing a knowledge tree structure rooted at Line 7. This mobile knowledge example tree contains information for both the "default" context Lines 8–12 and the "debug" context Lines 13–14.

The second idea, adding dynamic search rules for mobile knowledge, is shown by FIG. 14 Lines 10–13. In this example, the placeholder string "__COLL__" would be replaced by the pathname name of the mobile knowledge collection "/home/user/my-collection" at runtime, to form valid search rule directory pathnames that pointed to the encapsulated mobile knowledge.

In a conceptual sense, mobile knowledge is intended to mimic the human idea of associating additional knowledge with particular physical locations. For example, additional reference knowledge would be available to humans in a library location, and additional commerce knowledge would be available to humans in a bank location. Similarly, additional mobile knowledge becomes available to application programs that work within a mobile knowledge collection subtree.

Mobile knowledge allows human programmers to change directories into special mobile knowledge collections to access the knowledge that is stored there. Thus by changing directories, humans can influence the knowledge that is accessible to them. For example, human programmers can conveniently use mobile collections to set up special test environments containing special test environment knowledge, and then can ship the test environment around to their friends or coworkers.

It is not always beneficial to have all known knowledge available to programs, all of the time. Knowledge sets can conflict with each other. Instead, it is often quite useful to separate and partition knowledge into distinct chunks, and to change directories into particular mobile knowledge collections to temporarily extend or customize existing knowledge in particular ways.

The main technical mechanism for accessing mobile knowledge is dynamic search rules such as shown in FIG. 14 Lines 10–13.

Workspace Knowledge

Workspace knowledge is nested mobile knowledge. That is, workspace knowledge is knowledge that is contained in a series of nested collections within a computer filesystem. A workspace is defined as the series of nested collections that runs from the current working collection up toward the root directory of the filesystem. The top end of a workspace can terminate at the root directory of the filesystem, or at a directory level determined by implementation policy. For example, the implementation could specify that user home directories (e.g. "/home/user") were the top limit, instead of the root directory of the filesystem.

The main idea of workspace knowledge is for application programs to have access to knowledge contained in ancestor collections of the current working collection. Each ancestor collection above the current collection may or may not contain mobile knowledge.

For example, suppose a first mobile knowledge collection contains knowledge that is required to process a second group of several other collections. How can knowledge in the first mobile knowledge collection be accessed while applications are processing the other collections in the second group?

Workspace knowledge provides a mechanism for doing so, as follows. The first mobile knowledge collection is placed in a filesystem directory, and then all collections in the second group are placed within the collection subtree of the first mobile knowledge collection. Thus all collections in the second group become child subtrees of the first parent collection. Subsequently, when application programs work within the subtree one of the second group of collections, the first parent collection is an ancestor of the current working collection. Application programs can then search upward through ancestor directories to detect and utilize the mobile knowledge contained within those ancestor collections.

Thus workspace knowledge makes it possible for an application program working within a collection subtree to access additional mobile knowledge trees stored within ancestors of the current collection subtree location, by virtue of dynamic workspace knowledge search rules.

FIG. 22 shows an example nested mobile collection tree containing one ancestor collection "my-workspace" Line 2 and three working collections Lines 11–19. FIG. 23 shows an example search rule built for the collection tree of FIG. 22. In particular, FIG. 23 Line 5 shows an example workspace search rule containing a placeholder string "_WKSPC_". Assuming that an application program was working within the first of the nested working collections, the placeholder string "_WKSPC_" in Line 5 would be replaced by the pathname shown in Line 6, which points to knowledge Lines 16–17 stored within in the first mobile knowledge collection within the workspace.

In addition, the workspace rule on Line 5 would be expanded (replicated) as many times as necessary to point to knowledge trees contained in ancestor collections. Thus a second copy of rule 5 would point to the mobile knowledge tree rooted at Line 7 in the ancestor collection. Expanded workspace rules are discussed in more detail later in this document.

Aggregated Knowledge

Aggregated knowledge is non-nested mobile knowledge. That is, aggregated knowledge is comprised of named groups of non-nested mobile knowledge collections. The main idea of aggregated knowledge is to construct a named set of knowledge trees from multiple mobile knowledge collections.

In practice, aggregated knowledge can be explicitly referenced by an application program, or it can be dynamically picked up by an application program through an association with a physical filesystem location, as is done with workspace knowledge.

Aggregated knowledge is similar to workspace knowledge in almost all aspects except one. The primary difference between the two is that workspace knowledge organizes mobile knowledge collections by nesting them within each other, to support the idea of inheritance and automatic directory upsearches to locate ancestor knowledge collections.

In contrast, aggregated knowledge imposes no physical organizations on mobile knowledge collections. Instead, aggregated knowledge is represented by a "knowledge space" definition file comprised of a list of explicit references or explicit pathnames to mobile knowledge collections, wherever they are located. Thus aggregated knowledge can be implemented by collections located immediately beside each other, far away from each other, nested within each other, or by collections organized in some other manner.

FIG. 24 shows an example aggregated knowledge tree comprised of several mobile collections. FIG. 25 shows an example search rule expansion for the knowledge space of FIG. 24. In particular, FIG. 25 Line 2 shows a generic aggregated knowledge search rule containing placeholder strings. Lines 3–4 show how the placeholder strings would be replaced at runtime. Line 5 shows the resulting instantiated knowledge space search rule, which points at knowledge contained in the first mobile knowledge collection in FIG. 24 Line 7.

FIG. 26 shows an example aggregated knowledge space name table Lines 1–5 and an example aggregated knowledge space definition file Lines 6–11.

FIG. 27 shows how knowledge space stacks can be specified in command lines, environment variables, or in knowledge space anchor files (anchor files are explained later in this document). All three examples in FIG. 27 specify a knowledge space stack specifying two aggregated knowledge spaces, with the "agk-p1" knowledge space having precedence over the "dept 1" knowledge space.

When a final search rule list is constructed, all search rules in the "agk-p1" knowledge space will appear in the final list before all search rules in the "dept1" knowledge space, thereby implementing the desired knowledge precedence specified in the original aggregated knowledge space expressions.

Remote Knowledge

Remote knowledge is knowledge that is accessed over a network communication mechanism, rather than through a local computer filesystem. The two main ideas of remote knowledge are to centralize the administration of knowledge, and to increase the sharing of knowledge among remote people, sites, platforms, and application programs.

The main technical mechanisms for accessing remote knowledge are search rules containing remote lookup expressions, and a client-server knowledge delivery system. Remote lookup expressions contain four parts: (1) a remote knowledge treespace name, (2) a network server host name, (3) a knowledge tree name, and (4) a virtual platform name.

FIG. 28 Lines 16–18 show some example remote lookup expressions. Line 16 shows the generic format of a remote lookup expression, which is comprised of 4 parts: a knowledge treespace name, a computer hostname, a knowledge tree name, and a virtual platform name. The generic "ktreespace" component represents the name of a group of remote knowledge trees (a ktreespace name). The "dns" component represents the DNS (Domain Name Service) name of a network host computer running a knowledge delivery system. The "ktree" component represents the name of a particular knowledge tree within the knowledge tree namespace provided in Part 1 of the name. The "vplt= gnulinux2" component represents a virtual platform name for platform dependent lookups.

FIG. 29 Lines 1–4 show an example ktreespace name table. Lines 6–11 show an example kreespace definition file that lists the names and locations of several knowledge trees Lines 9–11.

Remote Aggregated Knowledge

Remote aggregated knowledge is similar to the local aggregated knowledge model described previously, except that remote aggregated knowledge is stored in remote mobile knowledge collections instead of local mobile knowledge collections.

The two main ideas of remote aggregated knowledge are to centralize the administration of knowledge and increase the sharing of knowledge among remote people, sites, platforms, and application programs.

FIG. 30 shows an example physical directory structure that provides remote aggregated knowledge for a knowledge space named "agk-p1" within a remote aggregated knowledge namespace named "my-aknamespace". These names can be seen in the name table and definition file of FIG. 32.

FIG. 31 shows an example search rule containing a remote aggregated knowledge lookup expression. The expression has 4 parts, like the remote knowledge expressions described before. Part 1 is the name of a remote aggregated knowledge namespace; Part 2 is the name of a DNS host computer; Part 3 is the name of an aggregated knowledge space within the Part 1 namespace; and Part 4 is the name of a virtual platform. Lines 1–2 show an example generic search rule. Lines 3–5 show how the generic rule would be expanded (that is, replicated and instantiated) for the three mobile knowledge collections shown in FIG. 30 Lines 4–16.

FIG. 32 shows three name table and definition files for remote aggregated knowledge spaces. Lines 1–5 show an example remote aggregated knowledge namespace name table. Lines 6–10 show an example remote aggregated knowledge namespace definition file. Lines 11–16 show an example remote aggregated knowledge space definition file that specifies various mobile knowledge collections.

Remote aggregated knowledge helps to reduce system complexity by centralizing both the administration and sharing of knowledge. When remote aggregated knowledge is used, fewer knowledge trees are required by the overall system, and they can all be maintained in one place.

Installable Knowledge

Installable knowledge is knowledge that can be reversibly installed into, or removed from, a knowledge tree.

The main idea of installable knowledge is to partition large bodies of knowledge into smaller chunks of knowledge that can be more easily managed. In particular, installable knowledge is intended to support the convenient construction of large, custom sets of knowledge by a relatively simple process of additively installing a series of installable knowledge packages into one or more constructed knowledge trees.

The two main technical mechanisms of installable knowledge are named installable knowledge collections and automated command sequences for installing and removing installable knowledge.

FIG. 33 shows an example collection containing installable knowledge. Lines 5–8 show the tree structure of the installable knowledge tree, which is the same as all other knowledge trees discussed previously.

FIG. 33 Line 4, however, is a special directory name that is recognized by the implementation. The special directory name on Line 4 tells the implementation that the installable knowledge tree should be installed in the custom knowledge tree for the "company" context.

Special directory names are not required. For example, user-defined installable knowledge directory names are possible within an installable knowledge collection. However, it is both practical and convenient to define a few standard installable knowledge directory names within an implementation, so that standard command sequences can be automatically used by the implementation to recognize and install or uninstall installable knowledge. If non-standard names are used, the implementation must be capable of automatically determining how to install knowledge contained in non-standard installable knowledge directories.

Installation of installable knowledge is typically done by copying subtrees into knowledge trees. Removal of installable knowledge is done by deleting the previously installed subtrees. Therefore those skilled in the art can appreciate that the technical mechanisms required for installing and removing installable knowledge are well known to the art and are simple to implement.

FIG. 34 shows an example custom "company" knowledge tree before and after installable knowledge has been installed. Lines 1–2 show the original custom company tree before installation; the tree is empty. Lines 3–11 show the knowledge tree after installation. The post-installation tree contains a variety of knowledge files for two applications named "app-1" and "app-2".

One important idea of installable knowledge is that installed knowledge retains an association with its original knowledge set even after installation, so that the installed knowledge can be easily uninstalled as a set. Maintaining such an association is very important. If no association is maintained after installation, the installed knowledge looks like any other knowledge in the post-installation knowledge tree, and cannot be easily identified for uninstallation or upgrading.

In preferred filesystem implementations of installable knowledge, the association is maintained as follows. All installable knowledge is comprised of two parts: an index file that lists all knowledge in the installable knowledge set, and a data directory that contains all knowledge within the installable knowledge set. Installation is accomplished simply by copying both the index file and the knowledge directory into a special installable knowledge directory within the destination knowledge tree. Uninstallation is accomplished simply by deleting the index file and knowledge directory from the special installable knowledge directory within the destination knowledge tree.

FIG. 33 Lines 5–8 show examples of a special installable knowledge installation directory, which is named "d-i" (directory installable) in this example. The particular name of the special installable knowledge directory is determined by implementation policy. Line 5 shows the name of a first installable knowledge index file, "idx-svc.tbl". Line 6 shows the corresponding data directory name, "z-svc". Line 7 shows a second installable knowledge index file, "idx-app2-data.tbl". Line 8 shows the matching data directory name, "z-app2-data".

The general correspondence pattern between index filenames and data directory names in this example is "idx-xxx.tbl" and "z-xxx", where "xxx" is chosen to describe the particular installable knowledge set. Particular matching patterns are determined by implementation policy. The particular matching pattern used here causes all index files to sort to the top of an alphabetic directory listing, thereby making it more convenient to list installable knowledge index names in small computer display windows without having to see matching data directories.

To install installable knowledge, index files and corresponding data directories are copied from the originating collection FIG. 33 Lines 5–8 to the destination knowledge tree installable knowledge directory "d-i" FIG. 34 Lines 8–11. If required, intervening directories are created within the destination tree between the installable knowledge tree top FIG. 33 Line 4 and the "d-i" directory. In the example above, the installation operation would automatically create the directories "default/app-1/pi/d-i" and "default/app-2/pi/d-i" within the destination "/site/cks/company" tree.

It is advantageous, but not necessary, to dynamically calculate the index file from the contents of the knowledge data directory at the time of installation. Typically, a simple list of installable knowledge elements and their locations within the data directory is placed within the index file. This way, humans can make additions and deletions to the installable knowledge data files without worrying about index maintenance procedures or associated labor costs.

Note that installable knowledge is always installed underneath a virtual platform directory (such as "pi") which is itself stored underneath an application program name in the knowledge tree. This is required to support platform dependent installable knowledge within application knowledge sets.

Figure 52:
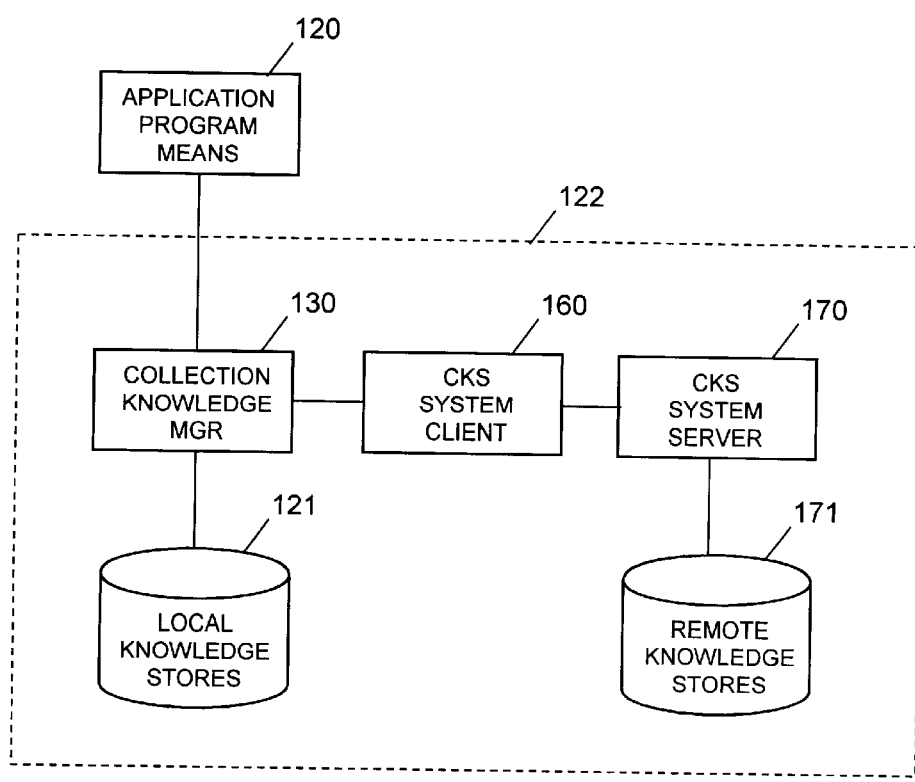
FIG. 52 shows a simplified architecture for a client server CKS system.

To install installable knowledge in client-server systems such as shown in FIG. 52, installation is achieved by passing installable knowledge across a network connection to a server, using a standard network data transport mechanism well known to the art, such as a TCP/IP protocol. Once the incoming installable knowledge arrives at the server, the server copies the index file and the corresponding data subtree into a special installable knowledge directory within the destination knowledge tree. Ignoring network transport and server issues, the installation process on the server side proceeds in the same way as described above for local installations.

To uninstall installable knowledge, index files and corresponding data subtrees are simply deleted from the special "d-i" directory in the destination knowledge tree. One way of identifying the files and directories to be uninstalled is to provide complete names as parameters to the uninstall operation. A second way is to provide appropriate "xxx" strings to the uninstall operation, which could calculate the actual index and data directory names according to the implementation patterns "idx-xxx.tbl" and "z-xxx". A third way is to perform the uninstallation from within the original installable knowledge collection, where the original index and data directory names can be obtained by listing the contents of the original installable knowledge collection. In all cases, uninstalled knowledge must be flushed from all knowledge caches maintained by the implementation.

To uninstall installable knowledge in client-server systems such as shown in FIG. 52, uninstallation is achieved by passing uninstall command parameters across a network connection to a server, using a standard network data transport mechanism that is well known to the art, such as a TCP/IP protocol. Once the uninstall information arrives at the server, the server deletes the index file and the corresponding data directory from the special installable knowledge directory within the destination knowledge tree. Ignoring network transport and server issues, uninstallation on the server side proceeds in the same way as described above for local uninstallations.

To upgrade, old installable knowledge is uninstalled, and new installable knowledge is installed, thereby replacing old installable knowledge with new installable knowledge and accomplishing the intent of the upgrade.

To maintain associations between the original installable knowledge set and the installed installable knowledge in database implementations of installable knowledge, each newly installed database record or table must carry a unique installable knowledge identification value to support the removal of all installable knowledge that was in the original installable knowledge set.

In preferred client server implementations, a Collection Knowledge System that is capable of installations and uninstallations over the network is called a Writeable Collection Knowledge System system. Writeable Collection Knowledge Systems are very useful because they permit many clients to easily install and upgrade knowledge on a central server.

For example, a Writeable Collection Knowledge System would be useful to a community of people who wanted to share knowledge among themselves. They could install such knowledge onto a Collection Knowledge System shared by the community members.

Because Collection Knowledge Systems provide knowledge directly to application programs, human users of installed knowledge are generally not required to understand the details of the installed knowledge. Instead, it is more typical that human users simply instruct application programs to access installed knowledge, to thereby carry out whatever operations the installed knowledge supports. This approach is advantageous, because it reduces the knowledge burden on human users. That is, they can obtain the benefits of installed knowledge through application programs, without really having to know anything about the details of the installed knowledge.

As can be seen from the foregoing discussion, installable knowledge is both convenient to use and to manage. Importantly, installable knowledge enables the efficient and widespread sharing of knowledge among remote people, sites, and application programs.

Cached Knowledge

Cached knowledge is knowledge that has previously been retrieved and stored for future use.

The main idea of cached knowledge is to provide increased performance on future lookups of knowledge that has been previously retrieved. Cached knowledge is held in application program memory using caching techniques that are well known to the art.

Collection Knowledge System

A CKS system has three major components.

One component is knowledge itself, which is stored in various knowledge structures including knowledge trees, mobile collections, and knowledge spaces.

A second component is a set of search rules, which are used to locate requested knowledge. The construction and use of knowledge search rules is perhaps the most critical part of understanding a CKS system.

A third component is CKS program software, which is responsible for building and using search rules to retrieve requested knowledge from knowledge stores on behalf of application programs.

In overall operation, an application program uses a CKS system to satisfy a knowledge request. In turn, the CKS system dynamically constructs a set of search rules for the particular incoming request, and uses the search rules to locate requested knowledge. Finally, the requested knowledge is returned to the caller.

The following discussion explains the overall architecture and operation of a Collection Knowledge System.

CKS-Enabled Application Architecture

Figures 35, 36:
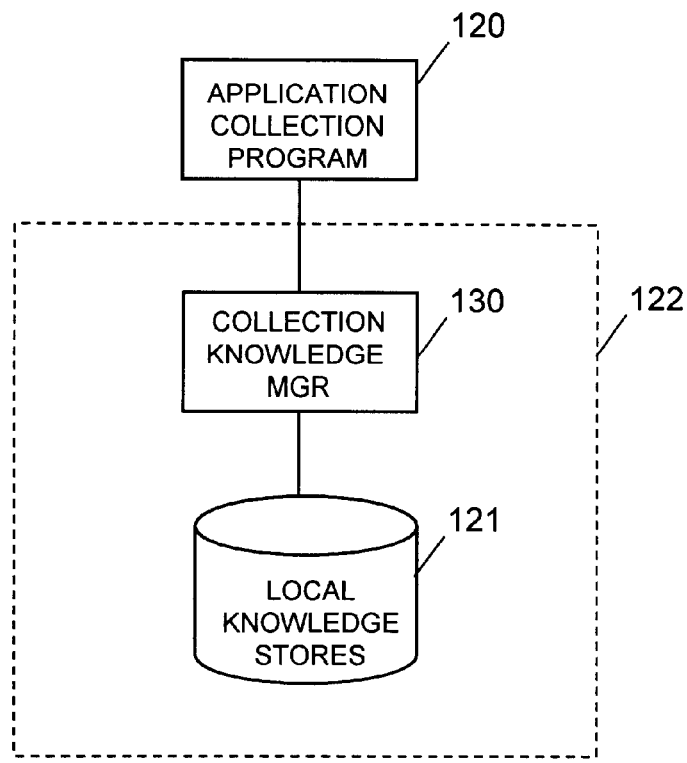
FIG. 35 shows a simplified architecture for an application program 120 that uses a CKS System 122 and CKS manager 130 to retrieve collection process knowledge from local knowledge stores 121.
FIG. 36 shows a simplified algorithm for an application program 120 using a CKS manager 130.

FIG. 35 shows a simplified architecture for an application program 120 that uses a CKS System 122 and CKS manager 130 to retrieve knowledge from local knowledge stores 121. A CKS manager module 130 oversees the process of building search rules and performing knowledge lookups.

FIG. 36 shows a simplified algorithm for an application program using a CKS manager 130. In operation, an application program calls a CKS manager 130 to retrieve and return knowledge that the application program requires to achieve its computational goals.

CKS Manager Architecture

Figures 37, 38:
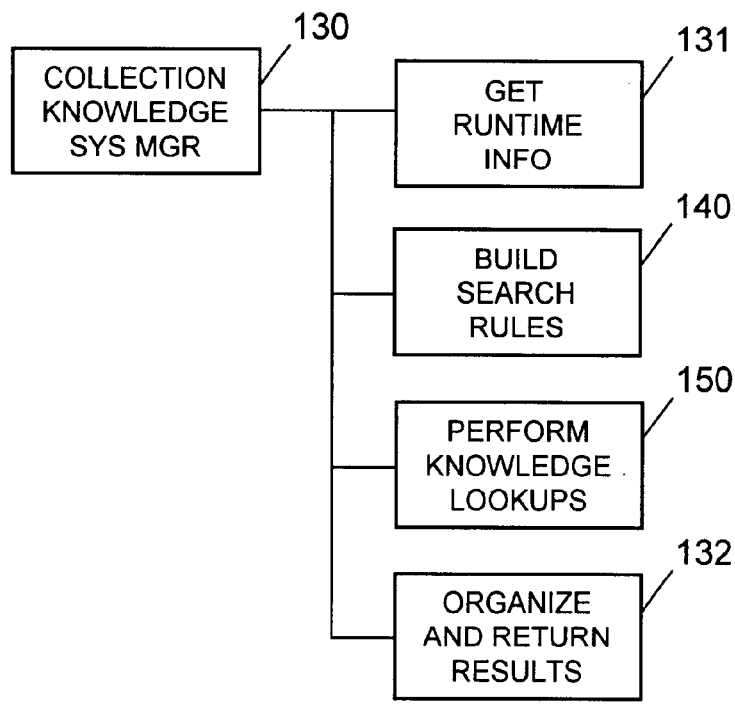
FIG. 37 shows a simplified architecture for a Module CKS Manager 130.
FIG. 38 shows a simplified algorithm for a Module CKS Manager 130.

FIG. 37 shows a simplified architecture for a Module CKS Manager 130.

Module Get Runtime Info 131 obtains runtime information required to support the knowledge retrieval operation. Information so retrieved typically includes environment variable values and invocation control and data arguments.

Module Build Search Rules 140 dynamically constructs a particular set of search rules for each incoming knowledge request. Typical search rule lists might specify 10 to 20 knowledge tree locations that should be searched to find reqested knowledge.

Module Perform Knowledge Lookups 150 performs lookups to satisfy the incoming knowledge request, using the search rules that were constructed by Build Search Rules 140.

Module Organize and Return Results 132 organizes retrieved knowledge into convenient forms for return to the calling module CKS Manager 130.

In operation, CKS Manager 130 proceeds according to the simplified algorithm shown in FIG. 38.

First, Module Get Runtime Information 131 obtains the values of various environment variables, including the location of an initial set of search rules and various possible invocation control arguments and knowledge request values. Runtime information is returned to the calling module.

Next, Module Build Search Rules 140 uses runtime and incoming knowledge request information to dynamically construct a particular set of search rules to satisfy the current knowledge request. Search rules may consider various kinds of knowledge stores, including customized knowledge, shared knowledge, platform dependent knowledge, mobile knowledge, workspace knowledge, aggregated knowledge, remote knowledge, and installable knowledge. Previously cached knowledge is always implicitly considered, even though the cache location is not explicitly represented by constructed search rules.

Next, Module Perform Knowledge Lookups 150 uses runtime, knowledge request, and search rule information to perform the requested knowledge lookups. Multiple lookups may be requested within one CKS Manager 130 invocation. In general, Module Perform Knowledge Lookups 150 traverses the constructed search rules one by one, searching for knowledge. For requests that specify that the "first found" knowledge be returned, the knowledge lookup operation terminates immediately after the first knowledge match is found. In contrast, some requests specify that all available knowledge matches be returned. In those cases, the entire set of search rules is traversed to find all available knowledge matches.

Finally, Module Organize and Return Results 132 organizes and returns retrieved knowledge results to Module CKS Manager 130, for eventual use by the originating application program 120.

Build Search Rules

FIG. 39 shows a simplified architecture for a Build Search Rules module 140.

Module Get Runtime Search Rule Information 141 obtains search-specific runtime information, such as determining the existence of "context.root" and "akspace.root" anchor files in the ancestor directories above the invocation working directory. (Anchor files are explained below.) Modules Upsearch For Context Root 142 and Upsearch For Aggregated Knowledge Space Root 143 are subordinate modules that actually perform the upsearches, respectively.

Module Get Initial Context Rules 144 uses environment variable values provided by Get Runtime Information 131 to locate an initial set of search rules. FIG. 41 Line 1 shows an example of an environment variable whose value is a pathname to an initial set of search rules. FIG. 41 Lines 2–7 show the contents of an example initial search rules file.

Module Add Customized Knowledge 145 uses the initial search rules obtained by Get Initial Context Rules 144 and one or more context names (search rule set names) to construct a second set of search rules. The second set of search rules is used to look up the requested knowledge. Specifically, Module Add Customized Knowledge uses the initial set of search rules to find a "context.tbl" context definition table as the first step in constructing the second set of search rules. FIG. 41 Lines 8–12 show the contents of a context name table.

Recall that a context is a named set of search rules that specify an ordered sequence of places to look for requested knowledge. Supposing that customized knowledge for debugging was desired, Add Customized Knowledge 145 would look up the "debug" name in the context name table FIG. 41 Line 11 to obtain the filename "debug.de", which specifies additional search rules for locating debugging knowledge. FIG. 41 Lines 14–16 show the additional search rules for debugging knowledge. The debugging rules would be the first rules added to the set of second rules, which would ultimately be used to search for knowledge to satisfy the current knowledge request. Search rules for customized knowledge are usually the first search rules in the second set of search rules FIG. 42, so that rules for customized knowledge can override search rules that point at uncustomized knowledge.

Module Instantiate Mobile Knowledge 146 instantiates existing search rules for mobile knowledge by replacing placeholder strings such as "__COLL__" with a pathname to the current working collection. Recall that mobile knowledge is knowledge that is stored and accessible in a mobile collection. FIG. 43 Lines 5–8 show a simplified example of mobile knowledge search rules. Mobile knowledge search rules containing placeholder strings are added to the second set of search rules as part of a of context, as described in more detail below.

Module Instantiate Workspace Knowledge 147 instantiates existing search rules for workspace knowledge by replacing placeholder strings such as "__WKSPC__" with a pathname to workspace mobile knowledge collections. Recall that workspace knowledge is knowledge that is stored in mobile knowledge collections that are hierarchical ancestors of the current working collection. FIG. 22 shows an example of workspace knowledge. Knowledge in the ancestor knowledge tree Lines 7–9 is available to application programs working within the child working collections Lines 11–19. Workspace knowledge search rules containing placeholder strings are added to the second set of search rules as part of a of context, as shown in FIG. 23, and as described in more detail below.

Module Add Aggregated Knowledge 148 further appends more search rules for aggregated knowledge to the growing second set of search rules. Recall that aggregated knowledge is defined as a named set of mobile knowledge collections, or "knowledge spaces." FIG. 43 Line 11 shows an example of an aggregated knowledge search rule. The placeholders "__AKNAME__" and "__AKCOLL__" represent the names of (a) an aggregated knowledge space and (b) a mobile knowledge collection within the aggregated knowledge space, respectively. Both placeholder strings are replaced at runtime with values appropriate for the current knowledge request.

Operation

In operation, Module Build Search Rules 140 proceeds according to the simplified algorithm shown in FIG. 40.

Build Search Rules 140 first calls Get Runtime Search Rule Information 141 to locate anchor files such as "context.root" FIG. 17 Line 6 and "akspace.root" FIG. 27 Line 6 above the current working directory. These anchor files specify lists of named contexts and named aggregated knowledge spaces that should be added to the search rules.

Anchor files represent the idea of associating particular named contexts and named aggregated knowledge spaces with particular physical locations in a computer filesystem. That way, application programs that are invoked in particular working directories can dynamically access context knowledge and aggregated knowledge that has been associated with those working directories. In effect, this approach mimics the human experience of associating work tools with particular physical spaces such as kitchens, workshops, or office spaces. That is, application programs can access additional knowledge when they execute within physical filesystem subtrees that have been associated with context or workspace knowledge by anchor files.

Get Runtime Search Rule Information 141 calls subordinate modules Upsearch For Context Root 142 and Upsearch For Knowledge Space Root 143 to actually perform the upsearches. Each subordinate module traverses filesystem directories upward from the current working directory, checking each successive ancestor directory for the existence of anchor files. FIG. 17 Lines 5–8 show the contents of a "context.root" anchor file. FIG. 27 Lines 5–8 show the contents of an "akspace.root" anchor file. The names of anchor files are determined by implementation policy.

Anchor file upsearches can terminate for several reasons. For example, when an anchor file is found, when a particular ancestor directory is reached, or when the filesystem root directory is reached. Particular termination behaviors are determined by implementation policy. In preferred implementations, upsearches usually terminate at a specific directory (such as a home directory).

Operation—Initial Context Rules

Next, Module Get Initial Context Rules 144 is called to obtain an initial set of search rules. The initial set of search rules is used to locate the context name table and context definition files that are used to construct the second set of search rules. The initial set of search rules is typically defined by a runtime environment variable such as shown by FIG. 41 Line 1. Get Initial Context Rules 144 obtains the desired pathname to an initial set of search rules by following the environment variable value. FIG. 41 Lines 2–7 show a simple example set of initial search rules.

Operation—Customized Knowledge

Next, Module Add Customized Knowledge 145 is called to begin the construction of a second set of search rules. The module must first identify a list of customized contexts (search rules for customized knowledge) that should be used. A list of such contexts is called a "context stack." FIG. 17 shows several ways of specifying a context stack. Lines 1–2 show how a context stack can be specified on a program invocation command line. Lines 3–4 show how a context stack can be specified using an environment variable. Lines 5–8 show how a context stack can be specified using a "context.root" anchor file.

For each context on the context stack, Add Customized Knowledge 145 finds a context definition file for the current context by looking up the context name in a context name table that is located using the initial search rules. FIG. 41 illustrates the lookup process. Line 1 shows an environment variable that points to a file that contains an initial set of search rules. Lines 2–7 show an example set of initial search rules.

FIG. 41 Lines 8–13 show a context name table that is located by looking up the name "context.tbl" using the initial search rules Lines 2–7. The first "context.tbl" file located using the initial search rules is selected for use.

Using the first context name "debug" from the context stacks shown in FIG. 17, the desired context definition file is located by looking up the context name "debug" in the context name table "context.tbl" FIG. 41 Lines 8–13. FIG. 41 Line 11 Column 2 specifies the desired context definition file name "debug.def".

The context definition file name "debug.def" is looked up using the initial search rules FIG. 41 Lines 2–7, to find an actual definition file that contains search rules for locating customized debugging knowledge. The first such file found using the initial search rules is selected for use.

FIG. 41 Lines 14–16 show an example context definition file for the "debug" context (which represents customized debugging knowledge). The single search rule FIG. 41 Line 16 in the found definition file specifies that the current user's home directory should be searched to obtain customized personal debugging knowledge.

FIG. 41 Lines 17–19 show an example context definition file for the "mine" context, which represents the personal customized knowledge of an individual user.

Continuing, since the "debug" context search rule FIG. 41 Line 16 is the first rule of the first context on the context stack, it therefore becomes the first search rule in the constructed second set of search rules. The second set of search rules will ultimately be used to locate the requested knowledge. FIG. 42 shows the beginnings of an example second set of constructed search rules, beginning with search rules defined by the "debug" context definition file FIG. 41 Lines 14–16.

Module Add Customized Knowledge 145 repeats the process above for each context on the current context stack, appending search rules as contexts specify. In particular, the "mine" context is the second context on the context stack of FIG. 17, so the search rules shown in FIG. 41 Lines 17–19 would be appended next to the growing second set of search rules that was begun with rules for the "debug" context.

FIG. 42 shows a second set of search rules that has been constructed from the examples so far. Note that rules for the "debug" context appear before rules for the "mine" context. This is because the debug context was listed first on the context stack of FIG. 17.

Operation—Default Knowledge

After all contexts on the explicit context stack have been added to the growing second list of search rules, search rules for the "default" context are automatically appended.

FIG. 43 shows an example context definition file for the "default" context. It contains generic, uninstantiated rules for mobile knowledge Lines 5–8, workspace knowledge Line 11, aggregated knowledge Line 14, and default customized knowledge for team, company, and vendor Lines 17–19.

Note that the default context search rules both extend and customize knowledge. Knowledge is extended by the use of mobile, workspace, and aggregated knowledge. Knowledge is customized by the use of customized knowledge search rules Lines 17–18. Vendor knowledge Line 19 is usually considered to be the most default and uncustomized knowledge set, since it is usually the first set of knowledge installed in a collection knowledge system.

As discussed before, mixing customization with extension in search rules may conflict with particular implementation policy goals. However, as long as there is no need to use the customized knowledge rules in Lines 17–18 to customize the extended knowledge provided by Lines 4–14, this set of search rules would cause no precedence problems.

Note that the search rules for mobile and workspace knowledge are generic, and contain various placeholder strings that are explained below. Placeholder strings in these rules are instantiated with specific values for the current knowledge request before the rules are used by Module Perform Knowledge Lookups 150.

The discussion now continues with operational explanations of mobile, workspace, and aggregated knowledge search rules.

Operation—Mobile Knowledge

Next, Module Instantiate Mobile Knowledge 146 is called to continue the construction of a second set of search rules.

In contrast to customized knowledge search rules that are appended to the second set of search rules according to named contexts on a context stack, mobile knowledge search rules cannot be appended. Instead, mobile knowledge search rules must be added into the second set of search rules as part of a context search rule set. Once in place, placeholder strings in mobile knowledge search rules are replaced at runtime with values appropriate to the current lookup situation. Module Instantiate Mobile Knowledge 146 performs the placeholder string replacements.

FIG. 43 shows an example context definition file containing search rules for a "default" context. The example file contains various placeholder strings such as "\_COLL\_", "\_WKSPC\_", "\_app\_", "\_AKNAME\_", and "\_AKCOLL\_" that are replaced at runtime with specific values for the current knowledge request. The mobile knowledge placeholder strings mean the following things: "\_COLL\_" is the current mobile knowledge collection, and "\_app\_" is the application program for which knowledge is being requested. Other placeholder strings are explained below.

In particular, the search rules shown in FIG. 43 specify the following search order for knowledge in the "default" context: mobile knowledge first, then workspace knowledge, then aggregated knowledge, then customized team, company, and vendor knowledge.

Lines 5–8 show four search rules for mobile knowledge, and illustrate the use of platform dependent search rules implemented by four virtual platforms. Other rules in FIG. 43 that are marked by trailing ellipsis dots also normally have four virtual platform rules, but are shown in abbreviated form to save presentation space.

FIG. 44 shows a second set of search rules where placeholder strings have been replaced with specific values for the current knowledge request. The set of search rules was constructed by starting with the "debug" context search rule, then appending the "mine" and "default" context search rules, then replacing all placeholder strings with specific values for the current knowledge request. The mobile knowledge search rule on FIG. 44 Line 9 uses a mobile knowledge collection pathname from FIG. 20 Line 9.

From the foregoing it should be clear that Module Instantiate Mobile Knowledge 146 does not add new mobile knowledge search rules to the second set of search rules. Instead, it only instantiates generic mobile knowledge rules that were added by the "default" context rules. Instantiation is done using specific replacement values for the current knowledge request.

Operation—Workspace Knowledge

Next, Module Instantiate Workspace Knowledge 147 is called to continue the construction of a second set of search rules.

Like mobile knowledge search rules, workspace rules must be added to the second set of search rules as part of a context search rule set. However, workspace search rules can be expanded (that is, replicated and instantiated) in situ, in linear proportion to the number of ancestor collections discovered by upsearch operations. Only one set of platform dependent generic rules need be added to the second set of rules, such as shown by the workspace knowledge rule in FIG. 43 Line 11. Recall that the trailing ellipsis dots on the workspace rule of Line 11 imply the existence of four virtual platform rules, like the ones shown on Lines 5–8. The whole set of four virtual platform workspace rules is instantiated once for each new ancestor collection discovered by the upsearch operation.

Placeholder strings in expanded workspace knowledge search rules are replaced at runtime with values appropriate to the current situation. Module Instantiate Workspace Knowledge 147 performs the placeholder string replacements.

FIG. 43 shows an example context definition file containing search rules for a "default" context. The example file contains various placeholder strings such as "\_WKSPC\_" and "\_app\_" that are replaced at runtime with specific values for the current knowledge request. The workspace knowledge placeholder strings mean the following things: "\_WKSPC\_" is the name of an ancestor mobile knowledge collection, and "\_app\_" is the application for which knowledge is being requested.

For example, suppose that a workspace upsearch operation discovered three ancestor collections. Then the set of search rules in FIG. 43 Line 11 would be replicated twice and be instantiated three times to point to the three discovered ancestor knowledge trees. Search rules for the ancestor nearest the current working collection (i.e. nearest the bottom of the ancestor chain) would appear first in the workspace search rules in the second set of constructed search rules. Search rules for the ancestor farthest from the current working collection (i.e. nearest the top of the ancestor chain) would appear last in the workspace search rules in the second set of constructed search rules.

From the foregoing it should be clear that Module Instantiate Workspace Knowledge 147 does not truly add new workspace knowledge search rules to the second set of search rules. Instead, it only replicates and instantiates generic search rules that were added by the "default" context rules. Generic workspace search rules are expanded during instantiation in linear proportion to the number of ancestor collections discovered in the workspace.

Operation—Aggregated Knowledge

Next, Module Instantiate Aggregated Knowledge 148 is called to continue the construction of the second set of search rules by adding search rules for spatial knowledge. Aggregated knowledge anchor files are found and used in essentially the same way as are context anchor files. Aggregated knowledge search rules are replicated and instantiated in essentially the same way as are workspace search rules.

FIG. 45 shows an example of aggregated knowledge in the form of an aggregated knowledge space named "agk-p1." This aggregated knowledge space contains three mobile knowledge collections Lines 6, 12, 18.

Module Instantiate Aggregated Knowledge 148 must first identify a list of aggregated knowledge spaces that should be instantiated. A list of such knowledge spaces is called an "aggregated knowledge space stack" or more simply, a "knowledge stack" or "akspace stack." FIG. 27 shows several ways of specifying an aggregated knowledge stack. Lines 1–2 show how a knowledge space stack can be specified on a program invocation command line. Lines 3–4 show how a knowledge space stack can be specified using an environment variable. Lines 5–8 show how a knowledge space stack can be specified using a "kspace.root" anchor file.

For each knowledge space on the knowledge stack, Instantiate Aggregated Knowledge 148 finds a knowledge space definition file for the current aggregated knowledge space by looking up the knowledge space name in an aggregated knowledge space name table that is located using the initial search rules. For example, consider the first knowledge space "agk-p1" named in FIG. 27, Line 2.

Module Instantiate Aggregated Knowledge 148 would first locate a knowledge space name table FIG. 46 called "name-akspace.tbl" by using the initial search rules. Next, the knowledge space name "agk-p1" would be looked up in the knowledge space name table to determine the name of a corresponding knowledge space definition file "agk-p1.def" on Line 3. A knowledge space definition file specifies all interesting properties of a knowledge space. In particular, Line 6 of the "agk-p1.def" definition file specifies the root directory of knowledge space "agk-p1" as "/site/agk/p1."

FIG. 47 shows the growing second set of constructed search rules again, this time with aggregated knowledge included. FIG. 43 Line 14 shows a generic aggregated knowledge rule containing placeholder strings. The placeholder "__AKNAME__" represents the base directory of the knowledge space; in this example, "/site/agk/p1 ." The placeholder "__AKCOLL__" represents a particular collection within a kspace.

FIG. 47 Lines 12–14 show several completed aggregated knowledge search rules after instantiation and placeholder replacement has occurred. As can be seen, the completed directory pathnames correspond to three knowledge space directories shown in FIG. 45 Lines 10, 16, 22. Thus the generic set of aggregated knowledge search rules was instantiated three times, one for each mobile collection in the aggregated knowledge space of FIG. 45.

From the foregoing it should be clear that Module Instantiate Aggregated Knowledge 148 does not truly add new aggregated knowledge search rules to the second set of search rules. Instead, it only replicates and instantiates generic aggregated knowledge rules that were originally added to the search rules as part of search rules for the "default" context.

FIG. 48 shows the second set of constructed search rules after search rules for the "debug", "mine", and "default" contexts have been added to the rule set. In addition, example rules for mobile, workspace, and aggregated knowledge have been instantiated. This set of instantiated search rules could be used to perform a local lookup operation.

This completes discussion of how the second set of search rules is constructed. The next section explains how the second set of search rules is used to locate requested knowledge.

Perform Knowledge Lookups

Figures 49, 50:
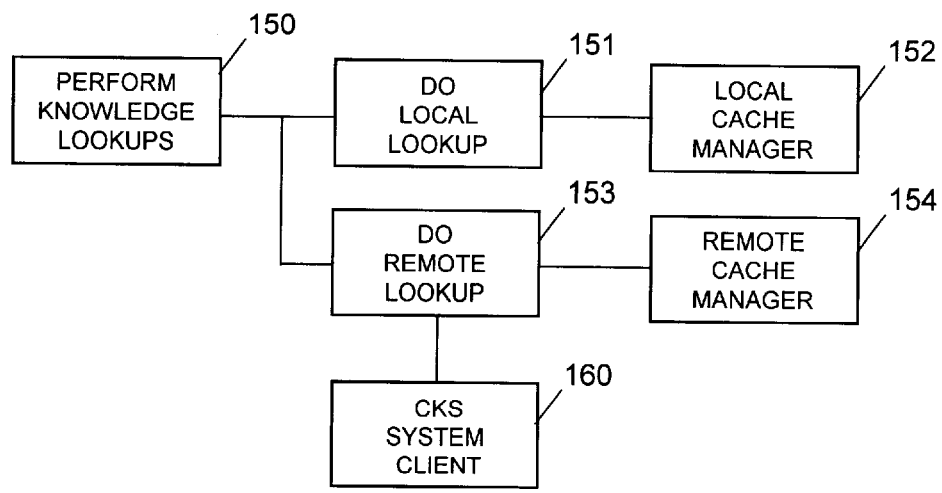
FIG. 49 shows a simplified architecture for a Perform Knowledge Lookups module 150.
FIG. 50 shows a simplified algorithm for a Perform Knowledge Lookups module 150.

FIG. 49 shows a simplified architecture for Module Perform Knowledge Lookups 150.

Module Do Local Lookups 151 performs lookups using local knowledge stores to satisfy knowledge requests. In a preferred filesystem implementation, local knowledge stores are comprised of various knowledge trees stored on a local computer disk.

Local Cache Manager 152 caches the results of local lookups to improve performance on successive lookups that reference the same local knowledge files.

Module Do Remote Lookup 153 performs lookups using remote knowledge stores to satisfy knowledge requests. In a preferred filesystem implementation, remote knowledge stores are comprised of various knowledge trees stored on remote computer disks. Remote knowledge is accessed using a Module CKS System Client 160 that is part of a client-server software architecture FIG. 52.

Remote Cache Manager 154 caches the results of remote lookups to improve performance on successive lookups that reference the same remote knowledge files.

In operation, Module Perform Knowledge Lookups 150 proceeds according to the simplified algorithm shown in FIG. 50.

Module Perform Knowledge Lookups 150 begins by traversing each search rule in the second set of search rules previously constructed by Build Search Rules 140. FIG. 51 shows an example second set of uninstantiated search rules that contains examples of search rules that were discussed above. FIG. 51 is not a typical set of search rules; it is more complex than normal to illustrate all types of rules in one example. Further, FIG. 51 shows search rules in a particular order, even though no particular order is required. The particular order of search rules within a second set of search rules is determined by dynamic context stacks and implementation policies for the "default" context.

Continuing, Module Perform Knowledge Lookups 150 performs a knowledge lookup for each rule in the second set of search rules until the original knowledge request is satisfied. Some lookups require that only the first instance of the desired knowledge be found and returned, whereas other lookups require that all instances of the desired knowledge be found and returned. Therefore the termination criteria for each lookup is peculiar to that particular lookup.

Module Do Local Lookup 151 is called if the current search rule is a search rule for local knowledge. Module Do Local Lookup 151 immediately calls Local Cache Manager 152 to see if the requested knowledge is resident in the cache. If so, the cached knowledge is returned. If not, Module Do Local Lookup 151 performs a lookup search by constructing a complete pathname to a potential knowledge file by prepending the search rule directory to the desired knowledge filename that was provided as a knowledge request parameter.

Module Do Local Lookup 151 checks to see if the desired knowledge file exists in the current search directory. If the local search succeeds, knowledge results are returned and added to a lookup cache by Local Cache Manager 152. The lookup operation terminates if the knowledge request is satisfied. If the knowledge request still requires further searching, other searches are made using subsequent search rules in the second set of search rules, until the lookup operation terminates.

FIG. 52 shows a simplified architecture for a client server CKS system.

Module Do Remote Lookup 153 is called if the current search rule is a search rule for remote knowledge. Module Do Remote Lookup 153 immediately calls Remote Cache Manager 154 to see if the requested knowledge is resident in the cache. If so, the cached knowledge is returned to the caller. If not, Module Do Remote Lookup 153 calls Module CKS System Client 160 to oversee the remote lookup.

Parameters from the current remote search rule are passed to CKS System Client 160 to specify the remote search. If the remote search succeeds, knowledge results are returned and added to a lookup cache by Remote Cache Manager 154. The remote lookup terminates if the knowledge request is satisfied. If the knowledge request still requires further searching, other searches are made using subsequent search rules in the second set of search rules, until the lookup operation terminates.

When Module CKS System Client 160 is called to resolve a remote lookup request, the client software passes the lookup request to Module CKS System Server 170. The server software is responsible for performing the physical lookup using knowledge stores accessible to the server.

Lookup algorithms on the server side mirror lookup algorithms for the local side, which have been described above. In particular, Module CKS System Server 170 functions almost exactly as does Module CKS Manager 130 as far as lookups are concerned, with the main difference being that the server can only perform "local" server lookups on local server knowledge stores. (Note that "local" on the server side means local to the server, even though "local" on the server side means "remote" from the client perspective.)

Module CKS System Server 170 uses the same algorithms as were described above to obtain initial search rules, to build a second set of search rules, and to perform the requested lookups. In essence, it is fair to say if client-server network mechanisms are ignored, Module CKS Manager 130 on the local effectively calls a peer Module CKS Manager 130 on the remote side to perform remote lookups. Those skilled in the art will immediately recognize the similarity in architectures, algorithms, and knowledge stores, as well as the strong opportunity for software reuse that is identified here.

On the server side of the network connection, parameters from the current remote search rule in the second set of search rules on the local side are used to construct physical search rules for the second set of search rules on the server side. Two kinds of remote search rules are possible: remote customized knowledge, and remote aggregated knowledge.

Lookups—Remote Customized Knowledge

Remote customized knowledge is slightly easier to explain, and so will be considered first here. FIG. 51 Lines 21–22 show an example search rule for remote customized knowledge. As described earlier, remote search rules contain 4 parts: a knowledge treespace name "my-cks", a computer hostname "dns", a knowledge tree name "team-1", and a virtual platform name "gnulinux2."

FIG. 29 Lines 1–4 show an example knowledge treespace name table, and Lines 6–11 show an example knowledge treespace definition file "my-cks.def" that lists the names and locations of several knowledge trees Lines 9–11.

In operation, the server build search rules module locates a knowledge treespace name table such as FIG. 29 on the server side, and looks up the knowledge tree name "my-cks" from the remote search rule parameter in the table FIG. 29 Line 4 to obtain a knowledge tree definition file "my-cks.def" Lines 6–11. In turn, the server looks up the current tree name "team-1" in the knowledge tree definition file FIG. 29 Line 10 Column 2 to obtain a physical pathname to the desired knowledge tree. Once the physical tree pathname has been determined, lookups proceed normally as they do on the local client side, as described earlier.

Lookups—Remote Aggregated Knowledge

Remote aggregated knowledge requires one extra lookup. FIG. 51 Lines 24–25 show an example search rule for remote aggregated knowledge. The rule contains 4 parts: an aggregated knowledge namespace name "my-aknamespace", a computer hostname "dns", a knowledge space name "agk-p1", and a virtual platform name "gnulinux2."

FIG. 32 shows example tables and definition files for remote aggregated knowledge lookups. Lines 1–5 show an example remote aggregated knowledge namespace name table. Lines 6–10 show an example remote aggregated knowledge namespace definition file. Lines 11–16 show an example remote aggregated knowledge space definition file that specifies three mobile knowledge collections corresponding to FIG. 30.

In operation, the server locates an aggregated knowledge namespace name table such as FIG. 32 Lines 1–5 on the server side. Then it looks up the aggregated knowledge namespace name "my-aknamespace" from the search rule FIG. 51 Line 25 in the table FIG. 32 Line 4 to obtain an aggregated knowledge namespace definition file "my-aknamespace.def" Lines 6–10. Next, the aggregated knowledge space name "agk-p1" from the remote search rule FIG. 51 Line 25 is looked up in the aggregated knowledge namespace definition file FIG. 32 Line 9 to eventually obtain an aggregated knowledge space definition file "agk-p1.def" FIG. 32 Lines 11–16. Finally, the physical pathname of the specified knowledge space tree is determined from the aggregated knowledge space definition file FIG. 32 Line 13 Column 2. Thereafter, lookups proceed as they do on the local side, as described earlier.

This completes discussion of the main architecture and algorithms of CKS System 122 and Module CKS Manager 130.

Knowledge Lookup Functions

FIG. 53 shows a list of example software functions for performing various kinds of lookups in a Collection Knowledge System. Although the list of functions is suitable for a preferred filesystem embodiment of a CKS system, other functions are also possible. The use of particular lookup functions is determined by implementation policy.

The algorithms of all functions shown in FIG. 53 are technically simple, and easily within the grasp of those skilled in the art. The algorithms all perform the same general task: construct a pathname from search rules and parameters, then check to see if the desired knowledge file exists. Those skilled in the art will immediately appreciate that only very simple technical manipulations are required to carry out the knowledge lookup task.

FIG. 54 shows a list of example parameters used by the functions shown in FIG. 53. Parameters have been grouped to show those that are required by all the example lookup functions shown in FIG. 53, and those that are required by only some lookup functions. Only those functions that search for particular keys or values use the key-name parameter. The use of particular parameters for particular lookup functions is determined by implementation policy.

Further Advantages

As can be seen from the foregoing discussion, a collection knowledge system manages several kinds of useful knowledge. In particular, the use of context knowledge provides a flexible, extensible means for implementing site knowledge policies. Thus collection knowledge systems provide a practical and useful service to application programs that use knowledge lookups to process collections in automated, scalable ways that were not previously possible.

CONCLUSION

The present Collection Knowledge System invention provides practical solutions to ten important knowledge delivery problems faced by builders of automated collection processing systems. The problems are: (1) the knowledge organization problem, (2) the customized knowledge problem, (3) the platform dependent knowledge problem, (4) the coupled-application knowledge problem, (5) the shared knowledge problem, (6) the scalable knowledge delivery problem, (7) the mobile knowledge problem, (8) the workspace knowledge problem, (9) the aggregated knowledge problem, and (10) the installable knowledge problem.

As can be seen from the foregoing disclosure, the present collection knowledge system invention provides application programs with a very practical means for obtaining precise answers to knowledge lookup requests in an automated, customizable, and scalable way that was not previously available.

Ramifications

Although the foregoing descriptions are specific, they should be considered as sample embodiments of the invention, and not as limitations. Those skilled in the art will understand that many other possible ramifications can be imagined without departing from the spirit and scope of the present invention.

General Software Ramifications

The foregoing disclosure has recited particular combinations of program architecture, data structures, and algorithms to describe preferred embodiments. However, those of ordinary skill in the software art can appreciate that many other equivalent software embodiments are possible within the teachings of the present invention.

As one example, data structures have been described here as coherent single data structures for convenience of presentation. But information could also be could be spread across a different set of coherent data structures, or could be split into a plurality of smaller data structures for implementation convenience, without loss of purpose or functionality.

As a second example, particular software architectures have been presented here to more strongly associate primary algorithmic functions with primary modules in the software architectures. However, because software is so flexible, many different associations of algorithmic functionality and module architecture are also possible, without loss of purpose or technical capability. At the under-modularized extreme, all algorithmic functionality could be contained in one software module. At the over-modularized extreme, each tiny algorithmic function could be contained in a separate software module.

As a third example, particular simplified algorithms have been presented here to generally describe the primary algorithmic functions and operations of the invention. However, those skilled in the software art know that other equivalent algorithms are also easily possible. For example, if independent data items are being processed, the algorithmic order of nested loops can be changed, the order of functionally treating items can be changed, and so on.

Those skilled in the software art can appreciate that architectural, algorithmic, and resource tradeoffs are ubiquitous in the software art, and are typically resolved by particular implementation choices made for particular reasons that are important for each implementation at the time of its construction. The architectures, algorithms, and data structures presented above comprise one such conceptual implementation, which was chosen to emphasize conceptual clarity.

From the above, it can be seen that there are many possible equivalent implementations of almost any software architecture or algorithm, regardless of most implementation differences that might exist. Thus when considering algorithmic and functional equivalence, the essential inputs, outputs, associations, and applications of information that truly characterize an algorithm should also be considered. These characteristics are much more fundamental to a software invention than are flexible architectures, simplified algorithms, or particular organizations of data structures.

Practical Applications

A collection knowledge system can be used in various practical applications.

One possible application is to improve the productivity of human computer programmers, by providing them with a way for storing and accessing knowledge for variant computational processes.

Another application is to share application program knowledge among a community of application program users, thereby allowing them to more easily advance the productivity of the community by virtue of shared knowledge stored in a collection knowledge system.

Another application is to centralize the administration of knowledge within a community of users, thereby shifting the burden of understanding and maintaining the knowledge from the many to the few.

Another application is to manage knowledge customization preferences for a community of people, in a way that permits people to share the customization preferences of other people. Thus new members of the community can receive both application program training and software environment preferences from the same coworkers.

Another application is to manage and distribute reusable software fragments to software reuse application programs, thereby promoting software reuse and reducing software development costs for application programs, websites, and other software projects.

Another application is to provide knowledge delivery services to collection makefile generator programs, which could use a collection knowledge system to obtain the precise, scalable, and customized knowledge that is required for generating makefiles for variant computational processes.

Another application is to provide IDE integrated development environments with a collection knowledge system that could provide customized knowledge to the integrated development system.

Another application is to provide knowledge to a network knowledge deliver server that was used by large numbers of application programs and users to obtain centralized policy settings for the overall network environment.

Functional Enhancements

One possible functional enhancement is to modify a CKS system to automatically share knowledge with other CKS systems, thereby creating a robust, distributed network of knowledge delivery servers on a network, where servers could replicate and share knowledge among themselves.

Knowledge Hierarchy

A four-level hierarchical organization of knowledge was presented here, comprised of the following levels: knowledge tree roots, contexts, applications, and virtual platforms. Special installable knowledge directories were also described.

However, other hierarchical organizations are also possible, with different orderings of the same levels, or with either more or fewer levels in the tree.

One possible alternate organization of the same number of levels would be to place the virtual platform level above the application level, thereby grouping all platform dependent information for a platform together. This organization is convenient for extending existing knowledge to a new platforms, because it makes it easier to find all the platform dependent knowledge within a knowledge tree. However, it does so at the cost of distributing application knowledge among several platform dependent subtrees, rather than keeping all application knowledge under one application subtree.

Another simpler organization is to remove the context level. This would make the system considerably less flexible and less powerful, but would result in considerably less complexity. For example, context stacks would not be required, and a second set of constructed search rules would not be required.

Other simpler organizations could be created by removing mobile knowledge, workspace knowledge, aggregated knowledge, installable knowledge, or virtual platform mechanisms. Each removal would reduce complexity, at a tradeoff cost of reduced power and flexibility.

Knowledge Files

The foregoing discussion was based on a preferred implementation that used simple text files to store knowledge. Using text files to represent knowledge has many advantages, that include at least simplicity, ease of use, and flexibility. However, other representations for knowledge are also possible.

As one example, databases could be used to store knowledge. In particular, databases could be a useful representation for large quantities of well-structured knowledge. In such cases, CKS systems could advantageously provide database support underneath a CKS API (Application Programming Interface) that was offered to application programs. As always, tradeoffs exist. Search rule formats would have to be altered to contain database search parameters instead of knowledge tree pathnames. Performance would likely be slower for large database systems than for smaller filesystem implementations. Particular choices of knowledge representations are determined by implementation policy.

As another example, SGML or XML representations could be used to store knowledge. This approach would offer more formal structuring and labelling of knowledge, by virtue of the markup tags used in SGML and XML. In addition, formal software parsers and GUI programs for manipulating XML knowledge files could be constructed. This would make it more convenient for at least some humans to work with knowledge files using tools specifically designed for the purpose, instead of using simple text editors on text files. One disadvantage of using XML or some other markup language is that it would complicate the look and content of knowledge files for humans, potentially increasing knowledge maintenance costs. Particular choices of knowledge representations are determined by implementation policy.

Initial Search Rules

The foregoing discussion described the use of an environment variable to point at an initial set of search rules. However, other methods are also possible.

For example, in some cases environment variables are not convenient or not possible, such as in computational processes that are spawned by Unix cron (automated scheduler) programs. These programs invoke programs with a very minimal set of environment variables, none of which point to an initial set of search rules.

One possible solution to this problem is to place a special file somewhere in the executable PATH that is specified by the default cron environment variables. That way, programs that need to find an initial set of search rules can search the directories listed in their PATH environment variables for the name of the special file. The special file would contain a pathname pointer to an initial set of search rules, corresponding to the value side of the environment variable assignment shown in FIG. 41 Line 1.

Search Rules

The foregoing discussion described a particular preferred implementation of search rules. However, other variations are possible.

One possible variation is to use mobile, workspace, aggregated, and installable knowledge in the initial set of search rules. Although this technique was not shown for reasons of simplicity, it can provide more search rule power at the cost of some complexity.

Another possible variation is to deliberately mix extension and customization knowledge within the same knowledge tree. This approach can reduce knowledge maintenance costs by reducing the number of required knowledge trees, at the tradeoff cost of coupling the two kinds of knowledge.

Another possible variation is to use non-linear search rule representations, such as a using a recursive tree traversal mechanism based on a tree of search rules. This approach would allow for "context subtrees" rather than linear sets of search rules in a context, and would allow for greater flexibility in creating complex search rule orders.

Another possible variation is to dynamically vary the composition of the search rule set in response to the particular knowledge that is the target of the lookup. For example, different sets of rules could be constructed at runtime depending on particular parameters of the lookup, such as application name, or desired filename, or key-value pair. Another example could use conditional runtime selection of rules in the constructed set, depending on the lookup parameters. Another example is to use more or fewer levels in the virtual platform hierarchy.

Virtual Platforms

The preferred embodiment described above uses a four-level virtual platform hierarchy to organize makefile fragment information into specific, generic, family, and platform independent operating system categories. However, other organizational schemes are also possible.

One example is to use a linear virtual platform structure that aggregates related information into fewer abstraction levels, perhaps by removing the generic level. Another example is to use a hierarchical structure organized by company, department, team, and individual.

As can be seen by one of ordinary skill in the art, many other ramifications are also possible within the teachings of this invention.

Scope

The full scope of the present invention should be determined by the accompanying claims and their legal equivalents, rather than from the examples given in the specification.

I claim:

1. A collection knowledge system process for delivering knowledge to application programs, comprising the following steps:

(a) receiving a knowledge request to provide requested knowledge, (b) building a set of search rules to guide a search for said requested knowledge, (c) performing a knowledge search for said requested knowledge using said set of search rules, and (d) returning knowledge search results to the request originator, thereby providing a solution to the scalable knowledge delivery problem, and thereby enabling application programs to obtain arbitrary processing knowledge in a fully-automated, scalable way that was not previously available.

2. The process of claim 1, wherein (a) said step of building a set of search rules uses an environment variable to reference an initial set of search rules, thereby helping to solve the customized knowledge problem, and thereby allowing human users to easily choose which of various sets of initial search rules should be used to begin said calculation of search rules, and thereby enabling human users to control the knowledge trees that are used by applications to formulate a second set of search rules that are used to perform a search for said requested knowledge.

3. The process of claim 1, wherein (a) said step of building a set of search rules uses a special file containing a pathname to reference an initial set of search rules, thereby allowing application programs that do not have access to environment variables to reference an initial set of search rules to begin said calculation of search rules, and thereby enabling human users to control the knowledge trees that are used by applications to formulate a second set of search rules that are used to perform a search for said requested knowledge.

4. The process of claim 1, wherein (a) said step of building a set of search rules uses a first set of initial search rules to build said set of search rules that are used to perform said knowledge search for said requested knowledge, thereby making it possible to dynamically calculate said second set of search rules using said first set of search rules, according to parameters of said knowledge request, and thereby enabling the use of particular knowledge trees for particular knowledge requests.

5. The process of claim 1, wherein (a) said step of building a set of search rules uses one or more named context definition files, thereby providing a solution to the customized knowledge problem, and thereby providing a solution to the coupled-application knowledge problem, and thereby making it possible for humans to use convenient named contexts to better specify and control knowledge searches for requested knowledge.

6. The process of claim 1, wherein (a) said step of building a set of search rules uses placeholder and instance substitution strings, thereby providing a mechanism for instantiating generic search rules with particular instance values from the current knowledge request, and thereby making it possible for humans to use convenient generic search rules to represent knowledge trees whose specific locations are calculated at runtime, and thereby increasing the flexibility of the search rule construction process.

7. The process of claim 1, wherein (a) said step of building a set of search rules uses mobile knowledge search rules, thereby providing a solution to the mobile knowledge problem, and thereby making it possible for humans to associate particular bodies of knowledge with particular filesystem locations, and thereby enabling application programs to have access to additional mobile knowledge when the current working directory of said application program lies within the boundaries of a mobile collection when a knowledge request is issued.

8. The process of claim 1, wherein (a) said step of building a set of search rules uses workspace knowledge search rules, thereby providing a solution to the workspace knowledge problem, and thereby making it possible for humans to associate particular bodies of knowledge with particular filesystem locations, and thereby enabling application programs to have access to additional knowledge contained within ancestor collections above the current working directory of application programs when knowledge requests are issued.

9. The process of claim 1, wherein (a) said step of building a set of search rules uses aggregated knowledge search rules, thereby providing a solution to the aggregated knowledge problem, and thereby making it possible for humans to associate particular bodies of knowledge with particular filesystem locations, or with particular aggregated knowledge space names, and thereby enabling application programs to have access to additional knowledge contained within aggregated knowledge spaces regardless of current working directories at the time knowledge requests are issued, and thereby making it possible for humans to use convenient, named aggregated knowledge space stacks to better specify and control knowledge requests.

10. The process of claim 1, wherein (a) said step of building a set of search rules uses virtual platform search rules, thereby providing a solution to the platform dependent knowledge problem, and thereby helping to solve the knowledge organization problem, and thereby enabling application programs to share platform dependent application knowledge among various virtual platforms, to reduce knowledge maintenance costs.

11. The process of claim 1, wherein (a) said step of building a set of search rules uses remote knowledge search rules, thereby providing a solution to the scalable knowledge delivery problem, and thereby helping to centralize knowledge administration activities and reduce knowledge maintenance costs.

12. The process of claim 1, wherein (a) said step of performing a search uses knowledge directories containing knowledge that is shared by multiple applications, thereby providing a solution to the shared knowledge problem, and thereby helping to solve the knowledge organization problem, and thereby helping to reduce knowledge maintenance costs by reducing the number of identical knowledge files required to support multiple application programs.

13. The process of claim 1, wherein (a) said step of performing a search uses installable knowledge directories, thereby providing a solution to the installable knowledge problem, and thereby helping to solve the knowledge organization problem, and thereby helping to reduce knowledge maintenance costs by enabling humans to work with smaller, mobile, encapsulated bodies of installable knowledge.

14. The process of claim 1, wherein (a) said step of performing a search uses a client program to initiate remote searches according to remote search rules, thereby providing a solution to the scalable knowledge delivery problem, and thereby reducing knowledge administration and maintenance costs on the client side of the network installation by using knowledge from remote servers.

15. The process of claim 1, wherein (a) said step of performing a search uses a server program to perform remote searches according to remote search rules, thereby providing a solution to the scalable knowledge delivery problem, and thereby reducing knowledge administration and maintenance costs on the client side of the network installation by centralizing knowledge administration and maintenance on shared knowledge servers.

16. A programmable collection knowledge system device for delivering knowledge to application programs, whose actions are directed by software executing a process comprising the following steps:

(a) receiving a knowledge request to provide requested knowledge, (b) building a set of search rules to guide a search for said requested knowledge, (c) performing a knowledge search for said requested knowledge using said set of search rules, and (d) returning knowledge search results to the request originator, thereby providing a solution to the scalable knowledge delivery problem, and thereby enabling application programs to obtain arbitrary processing knowledge in a fully-automated, scalable way that was not previously available.

17. The programmable device of claim 16, wherein (a) said step of building a set of search rules uses an environment variable to reference an initial set of search rules, thereby helping to solve the customized knowledge problem, and thereby allowing human users to easily choose which of various sets of initial search rules should be used to begin said calculation of search rules, and thereby enabling human users to control the knowledge trees that are used by applications to formulate a second set of search rules that are used to perform a search for said requested knowledge.

18. The programmable device of claim 16, wherein (a) said step of building a set of search rules uses a special file containing a pathname to reference an initial set of search rules, thereby allowing application programs that do not have access to environment variables to reference an initial set of search rules to begin said calculation of search rules, and thereby enabling human users to control the knowledge trees that are used by applications to formulate a second set of search rules that are used to perform a search for said requested knowledge.

19. The programmable device of claim 16, wherein (a) said step of building a set of search rules uses a first set of initial search rules to build said set of search rules that are used to perform said knowledge search for said requested knowledge, thereby making it possible to dynamically calculate said second set of search rules using said first set of search rules, according to parameters of said knowledge request, and thereby enabling the use of particular knowledge trees for particular knowledge requests.

20. The programmable device of claim 16, wherein (a) said step of building a set of search rules uses one or more named context definition files, thereby providing a solution to the customized knowledge problem, and thereby providing a solution to the coupled-application knowledge problem, and thereby making it possible for humans to use convenient named contexts to better specify and control knowledge searches for requested knowledge.

21. The programmable device of claim 16, wherein (a) said step of building a set of search rules uses placeholder and instance substitution strings, thereby providing a mechanism for instantiating generic search rules with particular instance values from the current knowledge request, and thereby making it possible for humans to use convenient generic search rules to represent knowledge trees whose specific locations are calculated at runtime, and thereby increasing the flexibility of the search rule construction process.

22. The programmable device of claim 16, wherein (a) said step of building a set of search rules uses mobile knowledge search rules, thereby providing a solution to the mobile knowledge problem, and thereby making it possible for humans to associate particular bodies of knowledge with particular filesystem locations, and thereby enabling application programs to have access to additional mobile knowledge when the current working directory of said application program lies within the boundaries of a mobile collection when a knowledge request is issued.

23. The programmable device of claim 16, wherein (a) said step of building a set of search rules uses workspace knowledge search rules, thereby providing a solution to the workspace knowledge problem, and thereby making it possible for humans to associate particular bodies of knowledge with particular filesystem locations, and thereby enabling application programs to have access to additional knowledge contained within ancestor collections above the current working directory of application programs when knowledge requests are issued.

24. The programmable device of claim 16, wherein (a) said step of building a set of search rules uses aggregated knowledge search rules, thereby providing a solution to the aggregated knowledge problem, and thereby making it possible for humans to associate particular bodies of knowledge with particular filesystem locations, or with particular aggregated knowledge space names, and thereby enabling application programs to have access to additional knowledge contained within aggregated knowledge spaces regardless of current working directories at the time knowledge requests are issued, and thereby making it possible for humans to use convenient, named aggregated knowledge space stacks to better specify and control knowledge requests.

25. The programmable device of claim 16, wherein (a) said step of building a set of search rules uses virtual platform search rules, thereby providing a solution to the platform dependent knowledge problem, and thereby helping to solve the knowledge organization problem, and thereby enabling application programs to share platform dependent application knowledge among various virtual platforms, to reduce knowledge maintenance costs.

26. The programmable device of claim 16, wherein (a) said step of building a set of search rules uses remote knowledge search rules, thereby providing a solution to the scalable knowledge delivery problem, and thereby helping to centralize knowledge administration activities and reduce knowledge maintenance costs.

27. The programmable device of claim 16, wherein (a) said step of performing a search uses knowledge directories containing knowledge that is shared by multiple applications, thereby providing a solution to the shared knowledge problem, and thereby helping to solve the knowledge organization problem, and thereby helping to reduce knowledge maintenance costs by reducing the number of identical knowledge files required to support multiple application programs.

28. The programmable device of claim 16, wherein (a) said step of performing a search uses installable knowledge directories, thereby providing a solution to the installable knowledge problem, and thereby helping to solve the knowledge organization problem, and thereby helping to reduce knowledge maintenance costs by enabling humans to work with smaller, mobile, encapsulated bodies of installable knowledge.

29. The programmable device of claim 16, wherein (a) said step of performing a search uses a client program to initiate remote searches according to remote search rules, thereby providing a solution to the scalable knowledge delivery problem, and thereby reducing knowledge administration and maintenance costs on the client side of the network installation by using knowledge from remote servers.

30. The programmable device of claim 16, wherein (a) said step of performing a search uses a server program to perform remote searches according to remote search rules, thereby providing a solution to the scalable knowledge delivery problem, and thereby reducing knowledge administration and maintenance costs on the client side of the network installation by centralizing knowledge administration and maintenance on shared knowledge servers.

31. A computer readable memory, encoded with data representing a collection knowledge system program that can be used to direct a computer when used by the computer, comprising:

(a) means for receiving a knowledge request to provide requested knowledge, (b) means for building a set of search rules to guide the search for said requested knowledge, (c) means for performing a knowledge search for said requested knowledge using said set of search rules, and (d) means for returning knowledge search results to the request originator, thereby providing a solution to the scalable knowledge delivery problem, and thereby enabling application programs to obtain arbitrary processing knowledge in a fully-automated, scalable way that was not previously available.

32. The computer readable memory of claim 31, wherein (a) said means for building a set of search rules uses an environment variable to reference an initial set of search rules, thereby helping to solve the customized knowledge problem, and thereby allowing human users to easily choose which of various sets of initial search rules should be used to begin said calculation of search rules, and thereby enabling human users to control the knowledge trees that are used by applications to formulate a second set of search rules that are used to perform a search for said requested knowledge.

33. The computer readable memory of claim 31, wherein (a) said means for building a set of search rules uses a special file containing a pathname to reference an initial set of search rules, thereby allowing application programs that do not have access to environment variables to reference an initial set of search rules to begin said calculation of search rules, and thereby enabling human users to control the knowledge trees that are used by applications to formulate a second set of search rules that are used to perform a search for said requested knowledge.

34. The computer readable memory of claim 31, wherein (a) said means for building a set of search rules uses a first set of initial search rules to build said set of search rules that are used to perform said knowledge search for said requested knowledge, thereby making it possible to dynamically calculate said second set of search rules using said first set of search rules, according to parameters of said knowledge request, and thereby enabling the use of particular knowledge trees for particular knowledge requests.

35. The computer readable memory of claim 31, wherein
(a) said means for building a set of search rules uses one or more named context definition files,
thereby providing a solution to the customized knowledge problem, and
thereby providing a solution to the coupled-application knowledge problem, and
thereby making it possible for humans to use convenient named contexts to better specify and control knowledge searches for requested knowledge.

36. The computer readable memory of claim 31, wherein
(a) said means for building a set of search rules uses placeholder and instance substitution strings,
thereby providing a mechanism for instantiating generic search rules with particular instance values from the current knowledge request, and
thereby making it possible for humans to use convenient generic search rules to represent knowledge trees whose specific locations are calculated at runtime, and
thereby increasing the flexibility of the search rule construction process.

37. The computer readable memory of claim 31, wherein
(a) said means for building a set of search rules uses mobile knowledge search rules,
thereby providing a solution to the mobile knowledge problem, and
thereby making it possible for humans to associate particular bodies of knowledge with particular filesystem locations, and
thereby enabling application programs to have access to additional mobile knowledge when the current working directory of said application program lies within the boundaries of a mobile collection when a knowledge request is issued.

38. The computer readable memory of claim 31, wherein
(a) said means for building a set of search rules uses workspace knowledge search rules,
thereby providing a solution to the workspace knowledge problem, and
thereby making it possible for humans to associate particular bodies of knowledge with particular filesystem locations, and
thereby enabling application programs to have access to additional knowledge contained within ancestor collections above the current working directory of application programs when knowledge requests are issued.

39. The computer readable memory of claim 31, wherein
(a) said means for building a set of search rules uses aggregated knowledge search rules,
thereby providing a solution to the aggregated knowledge problem, and
thereby making it possible for humans to associate particular bodies of knowledge with particular filesystem locations, or with particular aggregated knowledge space names, and
thereby enabling application programs to have access to additional knowledge contained within aggregated knowledge spaces regardless of current working directories at the time knowledge requests are issued, and
thereby making it possible for humans to use convenient, named aggregated knowledge space stacks to better specify and control knowledge requests.

40. The computer readable memory of claim 31, wherein
(a) said means for building a set of search rules uses virtual platform search rules,
thereby providing a solution to the platform dependent knowledge problem, and
thereby helping to solve the knowledge organization problem, and
thereby enabling application programs to share platform dependent application knowledge among various virtual platforms, to reduce knowledge maintenance costs.

41. The computer readable memory of claim 31, wherein
(a) said means for building a set of search rules uses remote knowledge search rules,
thereby providing a solution to the scalable knowledge delivery problem, and
thereby helping to centralize knowledge administration activities and reduce knowledge maintenance costs.

42. The computer readable memory of claim 31, wherein
(a) said step of performing a search uses knowledge directories containing knowledge that is shared by multiple applications,
thereby providing a solution to the shared knowledge problem, and
thereby helping to solve the knowledge organization problem, and
thereby helping to reduce knowledge maintenance costs by reducing the number of identical knowledge files required to support multiple application programs.

43. The computer readable memory of claim 31, wherein
(a) said step of performing a search uses installable knowledge directories,
thereby providing a solution to the installable knowledge problem, and
thereby helping to solve the knowledge organization problem, and
thereby helping to reduce knowledge maintenance costs by enabling humans to work with smaller, mobile, encapsulated bodies of installable knowledge.

44. The computer readable memory of claim 31, wherein
(a) said step of performing a search uses a client program to initiate remote searches according to remote search rules,
thereby providing a solution to the scalable knowledge delivery problem, and
thereby reducing knowledge administration and maintenance costs on the client side of the network installation by using knowledge from remote servers.

45. The computer readable memory of claim 31, wherein
(a) said step of performing a search uses a server program to perform remote searches according to remote search rules,
thereby providing a solution to the scalable knowledge delivery problem, and
thereby reducing knowledge administration and maintenance costs on the client side of the network installation by centralizing knowledge administration and maintenance on shared knowledge servers.

46. A process for installing installable knowledge into a collection knowledge system, comprising the following steps:
(a) accessing an index file describing the installable knowledge,
(b) accessing a knowledge data directory containing the installable knowledge, (c) installing said index file and said knowledge data directory into a special installable knowledge directory location within a collection knowledge system, thereby providing a solution to the installable knowledge problem, and thereby helping to reduce knowledge maintenance costs by enabling humans to work with smaller, mobile, encapsulated bodies of installable knowledge.

47. The process of claim 46, wherein (a) said index file is dynamically calculated as part of said step of installing said index file into a special installable knowledge directory, thereby reducing installable knowledge maintenance costs by the effort required to manually maintain indexes for installable knowledge, and thereby reducing error rates in indexes by removing all human labor from the process of creating such indexes.

48. The process of claim 46, wherein (a) said step of installing said index file and said knowledge data directory uses a client program to communicate with a remote collection knowledge system server, thereby enabling multiple clients to conveniently add knowledge to a remote server that is part of a client-server implementation of a collection knowledge system.

49. A programmable collection knowledge system device for installing installable knowledge into a collection knowledge system, whose actions are directed by software executing a process comprising the following steps:

(a) accessing an index file describing the installable knowledge, (b) accessing a knowledge data directory containing the installable knowledge, (c) installing said index file and said knowledge data directory into a special installable knowledge directory location within a collection knowledge system, and thereby providing a solution to the installable knowledge problem, and thereby helping to reduce knowledge maintenance costs by enabling humans to work with smaller, mobile, encapsulated bodies of installable knowledge.

50. The programmable device of claim 49, wherein (a) said index file is dynamically calculated as part of said step of installing said index file into a special installable knowledge directory, thereby reducing installable knowledge maintenance costs by the effort required to manually maintain indexes for installable knowledge, and thereby reducing error rates in indexes by removing all human labor from the process of creating such indexes.

51. The programmable device of claim 49, wherein (a) said step of installing said index file and said knowledge data directory uses a client program to communicate with a remote collection knowledge system server, thereby enabling multiple clients to conveniently add knowledge to a remote server that is part of a client-server implementation of a collection knowledge system.

52. A computer readable memory, encoded with data representing an installable knowledge program, that can be used to direct a computer when used by the computer, comprising:

(a) means for accessing an index file describing the installable knowledge, (b) means for accessing a knowledge data directory containing the installable knowledge, (c) means for installing said index file and said knowledge data directory into a special installable knowledge directory location within a collection knowledge system, thereby providing a solution to the installable knowledge problem, and thereby helping to reduce knowledge maintenance costs by enabling humans to work with smaller, mobile, encapsulated bodies of installable knowledge.

53. The computer readable memory of claim 52, wherein (a) said index file is dynamically calculated as part of said step of installing said index file into a special installable knowledge directory, thereby reducing installable knowledge maintenance costs by the effort required to manually maintain indexes for installable knowledge, and thereby reducing error rates in indexes by removing all human labor from the process of creating such indexes.

54. The computer readable memory of claim 52, wherein (a) said means for installing said index file and said knowledge data directory uses a client program to communicate with a remote collection knowledge system server, thereby enabling multiple clients to conveniently add knowledge to a remote server that is part of a client-server implementation of a collection knowledge system.

* * * * *